(12) United States Patent
Ouderkirk et al.

(10) Patent No.: US 10,578,872 B2
(45) Date of Patent: Mar. 3, 2020

(54) LENS WITH EMBEDDED MULTILAYER OPTICAL FILM FOR NEAR-EYE DISPLAY SYSTEMS

(71) Applicant: 3M INNOVATIVE PROPERTIES COMPANY, St. Paul, MN (US)

(72) Inventors: Andrew J. Ouderkirk, St. Paul, MN (US); Erin A. Binder, Afton, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 148 days.

(21) Appl. No.: 15/812,043

(22) Filed: Nov. 14, 2017

(65) Prior Publication Data

US 2018/0074331 A1    Mar. 15, 2018

Related U.S. Application Data

(63) Continuation of application No. 14/145,689, filed on Dec. 31, 2013, now Pat. No. 9,841,598.

(51) Int. Cl.
*G02B 27/01* (2006.01)
*G02B 27/28* (2006.01)
(Continued)

(52) U.S. Cl.
CPC ........... *G02B 27/0172* (2013.01); *G02B 5/28* (2013.01); *G02B 27/142* (2013.01);
(Continued)

(58) Field of Classification Search
CPC .......... G02B 27/0172; G02B 27/142; G02B 27/283; G02B 5/28; G02B 5/287; G02B 5/305; G02B 2027/0178; G02B 1/041
(Continued)

(56) References Cited

U.S. PATENT DOCUMENTS

| 3,680,946 A | 8/1972 | Bellows |
| 5,103,337 A | 4/1992 | Schrenk |

(Continued)

FOREIGN PATENT DOCUMENTS

| JP | 11-249062 | 3/2001 |
| JP | 2009-282211 | 12/2009 |

(Continued)

OTHER PUBLICATIONS

PCT International Search Report for PCT/US2014/070791 dated Mar. 10, 2015, 4 pages.

*Primary Examiner* — Collin X Beatty
(74) *Attorney, Agent, or Firm* — Jonathan L. Tolstedt

(57) ABSTRACT

A lens is formed from at least two sections or bodies that are shaped to mate with each other, and a multilayer optical film is sandwiched between these two sections. Smooth surfaces of each section combine to provide a first optical surface of the lens, e.g., a concave, convex, or flat optical surface. The multilayer optical film includes a stack of polymer layers configured to selectively reflect light by constructive or destructive interference, at least some of the polymer layers being birefringent. The multilayer optical film may thus be or comprise e.g. a reflective polarizer and/or a narrow band or otherwise notched reflector. The multilayer optical film has an extended terminus that separates the smooth surfaces of the two sections. Any edge defects such as cracks or delaminations that may exist along the extended terminus are characterized by an average defect distance of no more than 100 or 50 microns.

13 Claims, 11 Drawing Sheets

(51) Int. Cl.
*G02B 27/14* (2006.01)
*G02B 5/28* (2006.01)
*G02B 1/04* (2006.01)
*G02B 5/30* (2006.01)

(52) U.S. Cl.
CPC ............ *G02B 27/283* (2013.01); *G02B 1/041* (2013.01); *G02B 5/287* (2013.01); *G02B 5/305* (2013.01); *G02B 2027/0178* (2013.01)

(58) Field of Classification Search
USPC .................................................. 359/489.15
See application file for complete search history.

(56) References Cited

U.S. PATENT DOCUMENTS

| | | | |
|---|---|---|---|
| 5,360,659 A | 11/1994 | Arends |
| 5,389,324 A | 2/1995 | Lewis |
| 5,486,949 A | 1/1996 | Schrenk |
| 5,539,578 A | 7/1996 | Togino et al. |
| 5,546,227 A | 8/1996 | Yasugaki et al. |
| 5,654,827 A | 8/1997 | Reichert |
| 5,696,521 A | 12/1997 | Robinson et al. |
| 5,812,100 A | 9/1998 | Kuba |
| 5,882,774 A | 3/1999 | Jonza |
| 5,982,541 A | 11/1999 | Li et al. |
| 6,045,894 A | 4/2000 | Jonza |
| 6,157,490 A | 12/2000 | Wheatley |
| 6,179,948 B1 | 1/2001 | Merrill |
| 6,207,260 B1 | 3/2001 | Wheatley |
| 6,353,503 B1 | 3/2002 | Spitzer |
| 6,368,699 B1 | 4/2002 | Gilbert |
| 6,486,997 B1 | 11/2002 | Bruzzone |
| 6,531,230 B1 | 3/2003 | Weber |
| 6,783,349 B2 | 8/2004 | Neavin |
| 6,814,896 B2 | 11/2004 | Bhalakia |
| 6,822,770 B1 | 11/2004 | Takeyama |
| 6,926,410 B2 | 8/2005 | Weber |
| 6,939,499 B2 | 9/2005 | Merrill |
| 7,019,905 B2 | 3/2006 | Weber |
| 7,023,602 B2 | 4/2006 | Aastuen |
| 7,077,985 B2 | 7/2006 | Maki |
| 7,106,509 B2 | 9/2006 | Sharp |
| 7,234,816 B2 | 6/2007 | Bruzzone |
| 7,249,846 B2 | 7/2007 | Grand et al. |
| 7,256,936 B2 | 8/2007 | Hebrink |
| 7,316,558 B2 | 1/2008 | Merrill |
| 7,329,006 B2 | 2/2008 | Aastuen |
| 8,556,414 B2 | 10/2013 | Yoshida |
| 8,662,687 B2 | 3/2014 | Weber et al. |
| 2001/0030715 A1 | 10/2001 | Tabata |
| 2003/0030912 A1 | 2/2003 | Gleckman et al. |
| 2004/0212776 A1 | 10/2004 | Spitzer et al. |
| 2008/0013051 A1 | 1/2008 | Glinski et al. |
| 2008/0197518 A1 | 8/2008 | Aylward et al. |
| 2008/0239422 A1 | 10/2008 | Noda |
| 2010/0157433 A1 | 6/2010 | Mukawa et al. |
| 2011/0228511 A1 | 9/2011 | Weber et al. |
| 2011/0292333 A1 | 12/2011 | Kozaki et al. |
| 2012/0120365 A1 | 5/2012 | Legerton et al. |
| 2012/0162549 A1 | 6/2012 | Gao et al. |
| 2013/0010360 A1 | 1/2013 | Ouderkirk et al. |
| 2014/0063055 A1 | 3/2014 | Osterhout et al. |
| 2015/0219896 A1 | 8/2015 | Ouderkirk et al. |
| 2015/0234205 A1 | 8/2015 | Schowengerdt |

FOREIGN PATENT DOCUMENTS

| | | |
|---|---|---|
| JP | 2001-066544 | 12/2011 |
| WO | WO 2008-144136 | 11/2008 |
| WO | WO 2008-144656 | 11/2008 |
| WO | WO 2010-075357 | 7/2010 |
| WO | WO 2013-062996 | 5/2013 |

LENS WITH EMBEDDED MULTILAYER OPTICAL FILM FOR NEAR-EYE DISPLAY SYSTEMS

FIELD OF THE INVENTION

This invention relates generally to lenses and related optical components, with particular application to lenses that include a partially reflective element for purposes of beamsplitting. The invention also relates to associated articles, systems, and methods.

BACKGROUND

Optical beamsplitters are known. Some beamsplitters are made by cementing two prisms together with a reflective film in between. The reflective film typically extends between opposite edges of the beamsplitter. See e.g. U.S. Pat. No. 7,329,006 (Aastuen et al.)

Lenses, including compound lenses in which two or more simple lenses are cemented together, are also known. U.S. Pat. No. 5,654,827 (Reichert) discusses lenses in which the lens is divided into two parts by a beamsplitter.

Head-Up Displays or Head-Mounted Displays (collectively referred to herein as HUDs) can project an image that fills all or part of a user's field of view. Some HUDs use a combiner optic that integrates the projected image with the usual image of the external environment. In some cases, the HUD is a Near-Eye Display (NED), which may have a form factor similar to that of eyeglasses. See e.g. U.S. Pat. No. 6,353,503 (Spitzer et al.).

BRIEF SUMMARY

In Near Eye Displays and similar systems, the lens portion of the glasses desirably combines world and augmented (projected) views, provides high quality optical performance with a minimum of artifacts, and is also robust enough to withstand normal handling and usage typical for eyeglasses.

Multilayer optical films that include a stack of polymer layers configured to selectively reflect light by constructive or destructive interference have been used now for many years in a variety of applications in which high quality optical performance, with minimal artifacts, is required, such as in backlit display applications for laptop computers. However, embedding such films into a lens to function as a beamsplitter, particularly where the beamsplitter is designed to be off-axis relative to the optical axis of the lens, and also where at least some of the polymer layers in the stack are birefringent, poses certain design challenges and is by no means a trivial undertaking. If the degree of misalignment between the optical axis of the lens and the orientation of the optical film is large enough, the optical film may meet or intersect an optical surface of the lens. Such an intersection results in a bifurcation of the optical surface, with an edge of the multilayer optical film forming a line of separation between the two portions of the bifurcated optical surface. Polymer layers that are birefringent tend to be more brittle than those that are isotropic, and the edge of a multilayer optical film that contains birefringent polymer layers can therefore tend to have more breaks, cracks, and/or delaminations at such edge than an alternative film that contains no birefringent layers. If present at the edge of the film, such breaks, cracks, and other edge defects have the potential to significantly diminish the optical performance of the lens, particularly since they are located at or near the optical surface of the lens, directly in the path of incident light rays and within the clear aperture of the optical system.

We have found that multilayer optical films containing birefringent polymer layers can be successfully embedded into lenses to provide a beamsplitting function that may be suitable for Near-Eye Displays and similar applications. If the degree of misalignment between the optical axis of the lens and the orientation of the multilayer optical film is such that an optical surface of the lens is bifurcated by the film, care can be taken to ensure that the edge of the multilayer optical film that forms a line of separation between the portions of the bifurcated optical surface does not have excessive defects such as breaks, cracks, or delaminations, thus allowing for high quality optical performance of the lens. Ensuring that the film edge has minimal edge defects can also or alternatively enhance product robustness by reducing the chance of fracturing of the lens at the film edge (e.g. due to an edge delamination that spreads throughout the film) in the presence of stresses that may occur in the lens during product fabrication, installation, or use.

Lenses are thus disclosed in which the lens is formed from at least two sections or bodies that are shaped to mate with each other, and a multilayer optical film is sandwiched between these two sections. Smooth surfaces of each section combine to provide a first optical surface of the lens, such as a concave, convex, or flat optical surface. The multilayer optical film includes a stack of polymer layers configured to selectively reflect light by constructive or destructive interference, at least some of the polymer layers being birefringent. The multilayer optical film may thus be or comprise e.g. a reflective polarizer and/or a narrow band or otherwise notched reflector. The multilayer optical film has an extended edge or terminus that separates the smooth surfaces of the two sections. Any edge defects such as cracks or delaminations that may exist along the extended terminus are characterized by an average defect distance of no more than 100 or 50 microns.

We also describe herein, inter alia, lenses that have first and second opposed optical surfaces connected by a circumferential surface, such a lens also including a first and second lens section and a multilayer optical film embedded in the lens between the first and second lens sections. The first lens section has a first smooth surface and a side surface, and the second lens section has a first smooth surface, a second smooth surface, and a side surface. The multilayer optical film includes a plurality of polymer layers configured to selectively reflect light by constructive or destructive interference, at least some of the polymer layers being birefringent. The first optical surface of the lens includes the first smooth surface of the first lens section and the first smooth surface of the second lens section. The second optical surface includes the second smooth surface of the second lens section. The multilayer optical film includes a first extended terminus that separates the first smooth surface of the first lens section from the first smooth surface of the second lens section.

The circumferential surface may include the side surface of the first lens section and the side surface of the second lens section. In some cases, the first optical surface may include the first extended terminus. In some cases, the first extended terminus may be disposed in a first extended notch that separates the first smooth surface of the first lens section from the first smooth surface of the second lens section, and the first extended notch may be no more than 250 microns deep.

To the extent the multilayer optical film has any edge defects along the first extended terminus, such edge defects may be characterized by a first average defect distance of no more than 100 microns, or no more than 50 microns.

The first optical surface may be curved, and the first extended terminus may be arc-shaped. The first optical surface may instead be flat, and the first extended terminus may be straight.

The first lens section may also have a second smooth surface, and the second optical surface may include the second smooth surface of the first lens section and the second smooth surface of the second lens section, and the multilayer optical film may include a second extended terminus that separates the second smooth surface of the first lens section from the second smooth surface of the second lens section. In such cases, the second optical surface may also include the second extended terminus. The second extended terminus may alternatively be disposed in a second extended notch that separates the second smooth surface of the first lens section from the second smooth surface of the second lens section. To the extent the multilayer optical film may have any edge defects along the second extended terminus, such edge defects may be characterized by a second average defect distance of no more than 100 microns, or no more than 50 microns.

The multilayer optical film may be configured as a reflective polarizer for at least one visible wavelength of normally incident light. Additionally or alternatively, the multilayer optical film may be configured as a notch filter for at least one polarization state of normally incident light. In such cases, the multilayer optical film may also be configured as a reflective polarizer for at least one visible wavelength of normally incident light.

The lens may also include a protective coating that covers the first smooth surface of the first lens section, the first smooth surface of the second lens section, and the first extended terminus. The lens may also include an absorptive layer that covers the first optical surface or the second optical surface, and the absorptive layer may be or include an absorptive polarizer. The lens may also be bonded to a second lens to provide a compound lens. The lens may also be part of a system which also includes an imaging device disposed to direct imaging light towards the multilayer optical film. The multilayer optical film may be configured to selectively reflect visible light of a first characteristic and selectively transmit visible light of a second characteristic, and the imaging light may comprise the first characteristic. The first and second characteristics may be orthogonal first and second polarization states, respectively, and the lens may further include an absorptive polarizer configured to absorb light of the second polarization state. The system may be or include eyewear.

We also disclose optical components that have first and second opposed optical surfaces connected by a circumferential surface, such an optical component including a first section, a second section, and a multilayer optical film embedded in the optical component between the first and second sections. The first section may have a first smooth surface and a side surface, and the second section may have a first smooth surface, a second smooth surface, and a side surface, and the second section may be shaped to mate with the first section. The multilayer optical film may include a plurality of polymer layers arranged to selectively reflect light by constructive or destructive interference, at least some of the polymer layers being birefringent. The first optical surface may include the first smooth surface of the first section and the first smooth surface of the second section, and the second optical surface may include the second smooth surface of the second section, and the multilayer optical film may include a first extended terminus that separates the first smooth surface of the first section from the first smooth surface of the second section. In some cases, both the first and second optical surfaces may be flat.

We also disclose methods of making lenses, such methods including: providing a first optical body and a second optical body, the second optical body shaped to mate with the first optical body; providing a multilayer optical film, the multilayer optical film including a plurality of polymer layers configured to selectively reflect light by constructive or destructive interference, at least some of the polymer layers being birefringent; bonding the first and second optical bodies together with the multilayer optical film sandwiched therebetween to form a compound optical body; forming a first optical surface in the compound optical body, the forming being carried out to give a first smooth surface to the first optical body and a second smooth surface to the second optical body, the first and second smooth surfaces being portions of the first optical surface, the optical body also having, or made to have, a second optical surface opposite the first optical surface, and a circumferential surface that connects the first and second optical surfaces; and terminating the multilayer optical film along an extended terminus that separates the first smooth surface from the second smooth surface.

The terminating may be carried out to avoid edge defects in the multilayer optical film along the extended terminus, with any such edge defects being characterized by a first average defect distance of no more than 100 microns, or no more than 50 microns. The terminating may include polishing an end of the multilayer optical film, and the forming may include polishing the first and second optical bodies.

Related methods, systems, and articles are also discussed.

These and other aspects of the present application will be apparent from the detailed description below. In no event, however, should the above summaries be construed as limitations on the claimed subject matter, which subject matter is defined solely by the attached claims, as may be amended during prosecution.

BRIEF DESCRIPTION OF DRAWINGS

In the figures, like reference numerals designate like elements.

DETAILED DESCRIPTION OF ILLUSTRATIVE EMBODIMENTS

As mentioned above, we have developed lenses in which the lens is formed from at least two sections or bodies that are shaped to mate with each other, and a multilayer optical film is sandwiched between these two sections. The multilayer optical film is partially transmissive and partially reflective in order to give the lens a beamsplitting capability. The partial transmission and reflection may be primarily a function of polarization state of normally incident light (as with a broadband reflective polarizer), or may be primarily a function of optical wavelength (as with a notched filter), or may be a combination of these, and/or in combination with other characteristics. The multilayer optical film is oriented within the lens such that an edge or terminus of the film intersects an optical surface of the lens. The terminus separates smooth surfaces of each of the two lens sections, such smooth surfaces in combination providing an optical surface of the lens. Any edge defects such as cracks or delaminations that may exist along the film terminus may be characterized by an average defect distance of no more than 100 or 50 microns.

Figure 1:
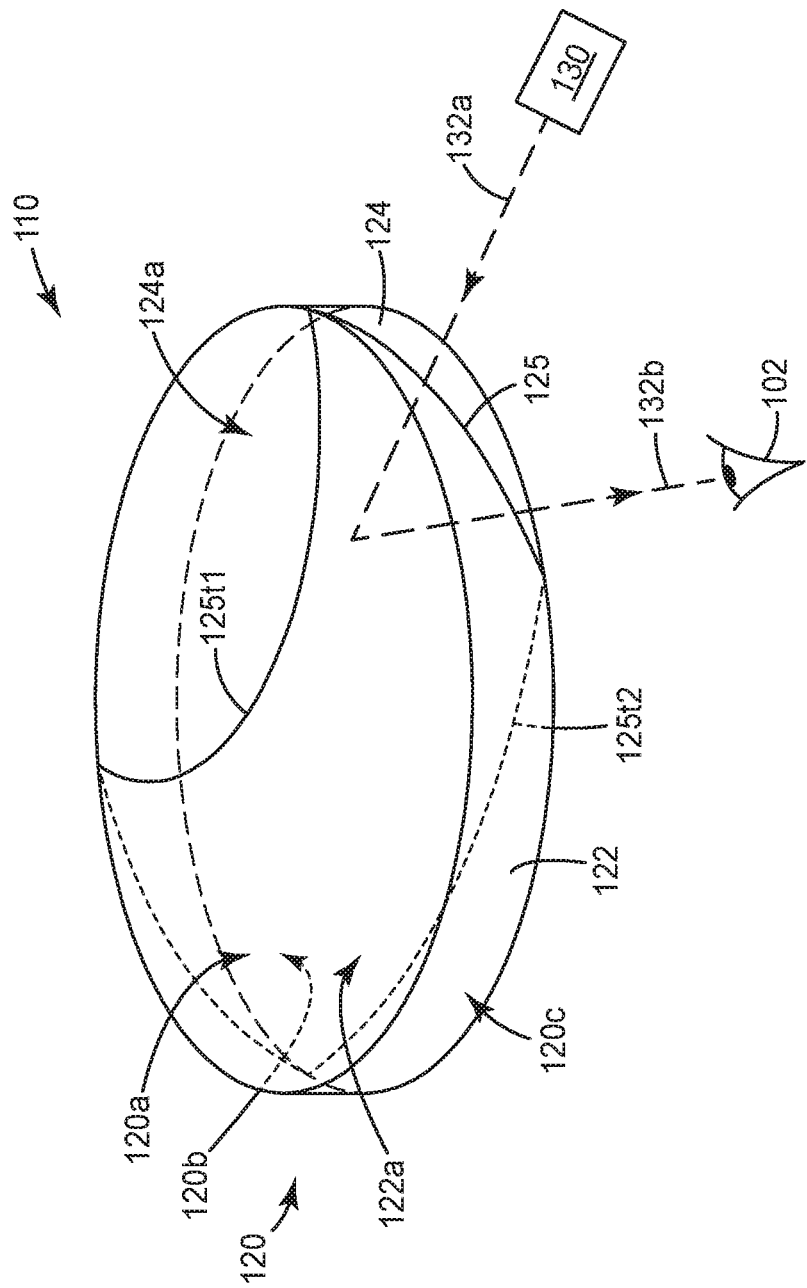
FIG. 1 is a schematic perspective view of system that includes a lens having an embedded multilayer optical film.

Turning to FIG. 1, we see there a schematic view of a system 110 that includes a lens 120 having an embedded multilayer optical film 125. The system 110 may, for example, be or include a Head-Up Display, a Head-Mounted Display, or a Near-Eye Display. The film 125 provides the lens 120 with a beamsplitting capability such that an observer can view (via light transmitted completely through the lens 120) objects that reside on the opposite side of the lens, which we refer to as a world view, and can also view (via light reflected by the film 125 and transmitted at least partially through the lens 120) images generated by an imaging device 130, which we refer to as a projected view. The eye 102 shown in the figure represents one eye of the observer. Arrow 132a represents light emitted by the imaging device 130, and arrow 132b represents light from the imaging device 130 which has been reflected by the multilayer optical film 125.

The lens 120 has a first optical surface 120a, and a second optical surface 120b opposed to the first optical surface 120a. In the depicted embodiment, each of these optical surfaces has a circular aperture and a circular periphery. The first optical surface 120a faces away from the observer and towards objects that are remote from the observer, while the second optical surface 120b faces towards the observer and away from remote objects. The optical surfaces 120a, 120b are predominantly smooth so that light can be refracted at their surfaces in a predictable fashion with little or no surface scattering. The surfaces 120a, 120b are assumed to be exposed to air or vacuum, but in other cases they may be exposed to a different light-transmissive medium, or they may be overcoated, and in some cases cemented to other optical components as discussed further below. In order to qualify as a lens, at least one of the optical surfaces 120a, 120b is curved, e.g., convex or concave, rather than flat. The curvature may be spherical, i.e., it may have a constant radius of curvature over substantially the entire optical surface, or it may be aspherical, with a radius of curvature that changes over the optical surface, usually in a gradual and continuous fashion. The curvature provides the lens 120 with a non-zero optical power, e.g. a positive optical power in the case of a converging lens or a negative optical power in the case of a diverging lens, unless both optical surfaces have the same curvature, in which case the lens 120 may have a zero optical power and may be neither converging nor diverging. Whether spherical or aspherical, an optical surface of the lens 120 which is curved typically has a rotational symmetry about an axis, e.g., an axis that coincides with an optical axis of the lens 120.

The first and second optical surfaces 120a, 120b are connected to each other by a circumferential surface 120c. In the depicted embodiment, the circumferential surface 120c is the ring-shaped side surface of the lens 120.

From a mechanical construction standpoint, the lens 120 is made up of a first lens section 122, a second lens section 124, and a multilayer optical film 125. The sections 122, 124 are sized and shaped to mate with each other, but the film 125 is interposed between their mating surfaces. The sections are bonded to each other through the film 125, e.g. by use of an optically clear adhesive, an optical cement, or by other suitable means. The film 125 may also be designed so that, when it is heated, the outer layers thereof can melt without melting or destroying the interior microlayers (discussed below) that provide the film with its partial reflectivity, and the melted outer layers can then bond the film 125 to the lens sections 122, 124. The film 125 may, for example, have optically thick outer skin layers made of a polymer material whose melting temperature, softening temperature, and/or glass transition temperature is lower than that of the microlayers in the film, and/or lower than the clearing temperature of the film 125, where the clearing temperature refers to the temperature at which the film 125 significantly and irreversibly changes its reflectivity due to excessive heat exposure. The film 125 is thus sandwiched between the first and second lens sections and embedded in the lens, except for the outermost edges of the film 125 which may be exposed to the outside environment.

The first and second lens sections each have a smooth surface which forms part of the first optical surface 120a. That is, the first lens section 122 has a smooth surface 122a, and the second lens section 124 has a smooth surface 124a. These smooth surfaces 122a, 124a are not randomly or arbitrarily shaped or oriented with respect to each other; rather, they are coordinated with each other to follow a same contour shape, such shape being the shape of the first optical surface 120a, e.g., concave with a given curvature or curvature distribution, or convex with a given curvature or curvature distribution, or flat. Inspection of FIG. 1 reveals that the smooth surfaces 122a, 124a do not actually meet or touch each other, but, due to the presence of the multilayer optical film 125 between the lens sections 122, 124, are separated by an extended terminus or edge 125t1 of the film 125. The extended terminus resides at or near the first optical surface 120a, within the clear aperture of the lens 120 and directly in the path of incident light rays. This is a consequence of the optical film 125 being oriented at a substantial oblique angle relative to the optical axis of the lens 120. For purposes of FIG. 1, the film 125 is assumed to be planar (or approximately planar) and the first optical surface 120a is assumed to be convex, which results in the extended terminus 125t1 being arc-shaped when viewed along the optical axis of the lens 120.

The lens sections 122, 124 may be made of any suitable light-transmissive optical material, for example, an optically clear polymer such as a polycarbonate, an acrylate such as polymethylmethacrylate (PMMA), a cyclic polyolefin copolymer and/or a cyclic polyolefin polymer, or a silicone, or an optical glass or ceramic such as a soda lime glass, a borosilicate glass, silica, or sapphire. Typically, the sections 122, 124 are composed of the same or similar optical material, and have the same or similar refractive index. In some cases, however, the sections 122, 124 be composed of substantially different optical materials and may have substantially different refractive indices, or substantially the same refractive indices with some material combinations. The refractive index of each section is typically isotropic rather than birefringent.

The multilayer optical film 125 includes a plurality of polymer layers whose optical thicknesses are small enough, whose refractive indices are different enough along at least one axis, and whose arrangement into one or more stacks or packets of layers, is such that they cooperate with each other to selectively reflect light by constructive or destructive interference. The selective reflection allows some light, e.g., visible light from the imaging device 130, to be reflected so the user can perceive the projected view, while simultaneously allowing other light, e.g. a complementary spectrum or complementary polarization state of visible light from remote objects on the opposite side of the lens, to be transmitted so the user can perceive the world view. More description of suitable multilayer optical films is provided further below, but it is also worth noting that at least some, and in some cases all or substantially all, of the polymer layers within the one or more stacks or packets of layers are birefringent. Such birefringence is typically the result of stretching or otherwise orienting a layered extrudate after casting, in one or both in-plane directions of the film.

The multilayer optical film 125 terminates at or near the outer boundaries or surfaces of the lens 120. Due to the film's skewed or tilted orientation with respect to the lens 120 or its optical axis, the film 125 terminates at an edge or terminus 125t1 at the first optical surface 120a. The terminus 125t1 separates the smooth surface 122a from the smooth surface 124a. At the second optical surface 120b, the film 125 may also terminate at an edge or terminus 125t2. The terminus 125t2 separates another smooth surface of the section 122 from another smooth surface of the section 124. The terminuses 125t1, 125t2, or at least large portions thereof, lie well within the active areas or apertures of the respective optical surfaces 120a, 120b, and because of this they have the potential to substantially distort or otherwise degrade the optical performance of the lens 120. Any defects along the film terminus (referred to herein as edge defects), such as film breaks, film cracks, or film delaminations, can refract or otherwise redirect light to propagate in directions that differ from the direction that would be imparted by the undistorted or undisturbed optical surface, thus distorting or degrading optical performance, e.g. introducing an extended line of distortion in the world view as seen through the lens 120. Because of the sensitivity of the lens 120 to edge defects of the multilayer optical film, the film 125 may be cut, polished, and/or otherwise processed in such a way as to reduce the number of such edge defects, and to ensure the defects, if any, are physically small enough to keep any optical degradation or distortion to a manageable level. This aspect of the multilayer optical film 125 is also discussed further below.

The imaging device 130 may be or comprise an OLED display, a transmissive liquid crystal display, a reflective LC display (such as, for example, a Liquid Crystal on Silicon (LCoS) display), or a scanned laser device. The device 130 and the multilayer optical film 125 may be designed or selected so that they have matching or substantially matching optical characteristics to enhance system efficiency, i.e., so that the film 125 provides a high reflectivity of light from the device 130 while also providing a high transmission of light from remote objects. Thus, the device 130 may emit polarized light, and the film 125 may then be tailored to have a high reflectivity for that polarization state and a low reflectivity (and high transmission) for light of the orthogonal polarization state. Alternatively or in addition, the device 130 may emit light selectively in one or more narrow bands (e.g., it may emit light in only one narrow band, such as in the red, green, or blue region of the spectrum, or it may emit light in two or three such narrow bands that do not substantially overlap), and the film may then be tailored to have a high reflectivity only in the narrow band or bands being emitted by the device 130.

Lenses and imaging devices such as those of FIG. 1 can be incorporated into Near-Eye Displays or similar optical systems as discussed above. An example of such a system is shown schematically in FIGS. 2A and 2B. There, eyewear 210 incorporates a left lens 220 and a right lens 240, which may be the same as or similar to lens 120 of FIG. 1. The eyewear 210 provides a Near-Eye Display (projected view) while also allowing the user to see remote objects in a world view. The lenses 220, 240 are held in place in front of a user's eyes 202, 203, respectively, by an eyewear frame 212. The frame 212 may also provide a mounting structure for left and right imaging devices 230, 250 respectively, which can be energized to direct imaging light toward the left and right lenses, respectively, the imaging light being reflected by the associated multilayer optical film to provide projected views to the left and right eyes. The eyewear 210 is shown in the context of a Cartesian x-y-z coordinate system, where the user's eyes are assumed to lie along an axis parallel to the x-axis, and the lenses are assumed to be oriented such that their optical axes each extend parallel to the z-axis.

Each lens has first and second opposed optical surfaces connected by a circumferential surface. Thus, left lens 220 has first and second opposed optical surfaces 220a, 220b, respectively, connected by a circumferential surface 220c, and right lens 240 has first and second opposed optical surfaces 240a, 240b, respectively, connected by a circumferential surface 240c. The curvatures of the optical surfaces, together with the refractive indices of the lens materials, determine the optical powers of the lenses. Each lens is also assumed to have an optical axis, see axes 221, 241 for the lenses 220, 240 respectively, about which the optical surfaces of the lens may have rotational symmetry.

Each lens 220, 240 comprises an embedded multilayer optical film that operates as a beamsplitter, as discussed in connection with lens 120. Each lens also has a 2-part construction, having two distinct lens sections shaped to mate with each other, with the multilayer optical film embedded in between. Thus, lens 220 is made up of a first lens section 222, a second lens section 224, and a multilayer optical film 225. The sections 222, 224 are sized and shaped to mate with each other, but the film 225 is interposed between their mating surfaces, and the sections are bonded to each other through the film 225. Lens 240 is likewise made up of a first lens section 242, a second lens section 244, and a multilayer optical film 245. The sections 242, 244 are sized and shaped to mate with each other, but the film 245 is interposed between their mating surfaces, and the sections are bonded to each other through the film 245. Due to the off-axis placement of the imaging devices, the multilayer optical films 225, 245 are skewed or tilted with respect to the optical axes of their respective lenses in order to direct the imaging light appropriately to the respective eye of the user. In the figure, a normal (orthogonal) axis 225x is perpendicular to the plane of the multilayer optical film 225, and a normal (orthogonal) axis 245x is perpendicular to the plane of the multilayer optical film 245. These axes are tilted relative to the optical axis of their respective lens as shown in the figure.

Regarding the left lens 220, the first and second lens sections 222, 224 have smooth outer surfaces that are shaped and configured to collectively follow a same contour shape, such shape being the shape of the first optical surface 220a. In this embodiment, the first optical surface 220a is convex. Due to the amount of tilt between the normal axis 225x and the lens optical axis 221, the multilayer optical film 225 has an extended terminus 225t1 which resides at or near the first optical surface 220a, and separates the smooth outer surfaces of the lens sections 222, 224. The first and second lens sections 222, 224 also have smooth inner surfaces that are shaped and configured to collectively follow a same contour shape, such shape being the shape of the second optical surface 220b. In this embodiment, the second optical surface 220b is concave. The multilayer optical film 225 has an extended terminus 225t2 which resides at or near the second optical surface 220b, and separates the smooth inner surfaces of the lens sections 222, 224. The second optical surface 220b may have the same curvature as the first optical surface 220a or a different curvature; if they are the same, the lens 220 may have zero optical power.

The right lens 240 may have a construction which is an exact or approximate mirror image of the left lens 220. If they are approximate mirror images of each other, they may have different optical powers and different curvatures of their respective optical surfaces, just as the lenses in conventional eyeglasses often have different optical powers to make up for differences in the optical prescription of the user's left and right eyes.

Thus, the first and second lens sections 242, 244 of the right lens 240 have smooth outer surfaces that are shaped and configured to collectively follow a same contour shape, such shape being the shape of the first optical surface 240a. In this embodiment, the first optical surface 240a is convex. The multilayer optical film 245 has an extended terminus 245t1 which resides at or near the first optical surface 240a, and separates the smooth outer surfaces of the lens sections 242, 244. The first and second lens sections 242, 244 also have smooth inner surfaces that are shaped and configured to collectively follow a same contour shape, such shape being the shape of the second optical surface 240b. In this embodiment, the second optical surface 240b is concave. The multilayer optical film 245 has an extended terminus 245t2 which resides at or near the second optical surface 240b, and separates the smooth inner surfaces of the lens sections 242, 244. The second optical surface 240b may have the same curvature as the first optical surface 240a or a different curvature; if they are the same curvature, the lens 240 may have zero optical power.

The imaging devices 230, 250 may be the same as or similar to the imaging device 130 discussed previously to maximize or enhance system efficiency. They may be tailored or selected to match or substantially match optical characteristics, such as polarization and/or wavelength characteristics, of their respective multilayer optical films 225, 245, as discussed above.

Figure 2A:
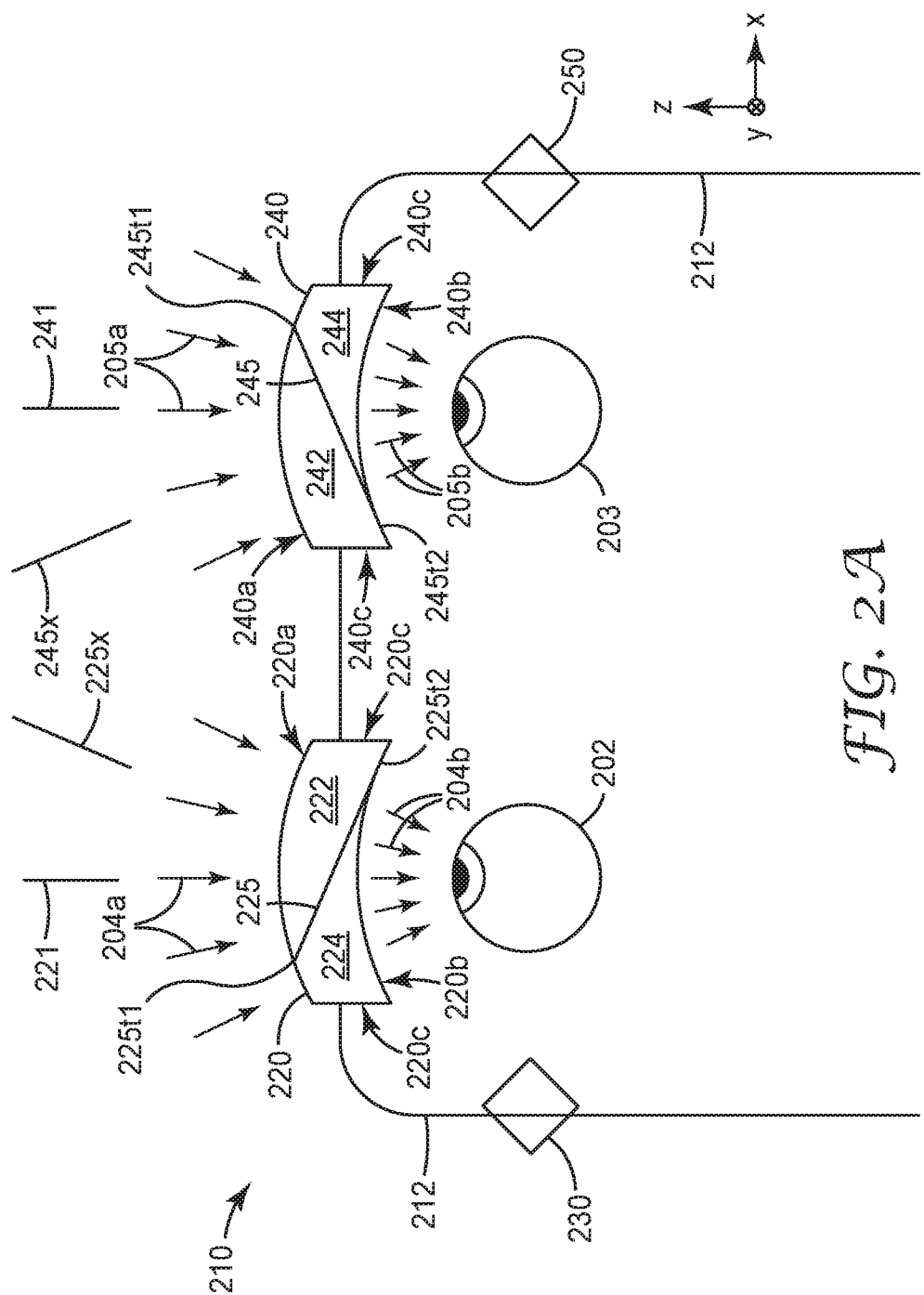
FIGS. 2A and 2B are schematic top views of eyewear that incorporates lenses having embedded multilayer optical films, and imaging devices.
Figure 2B:
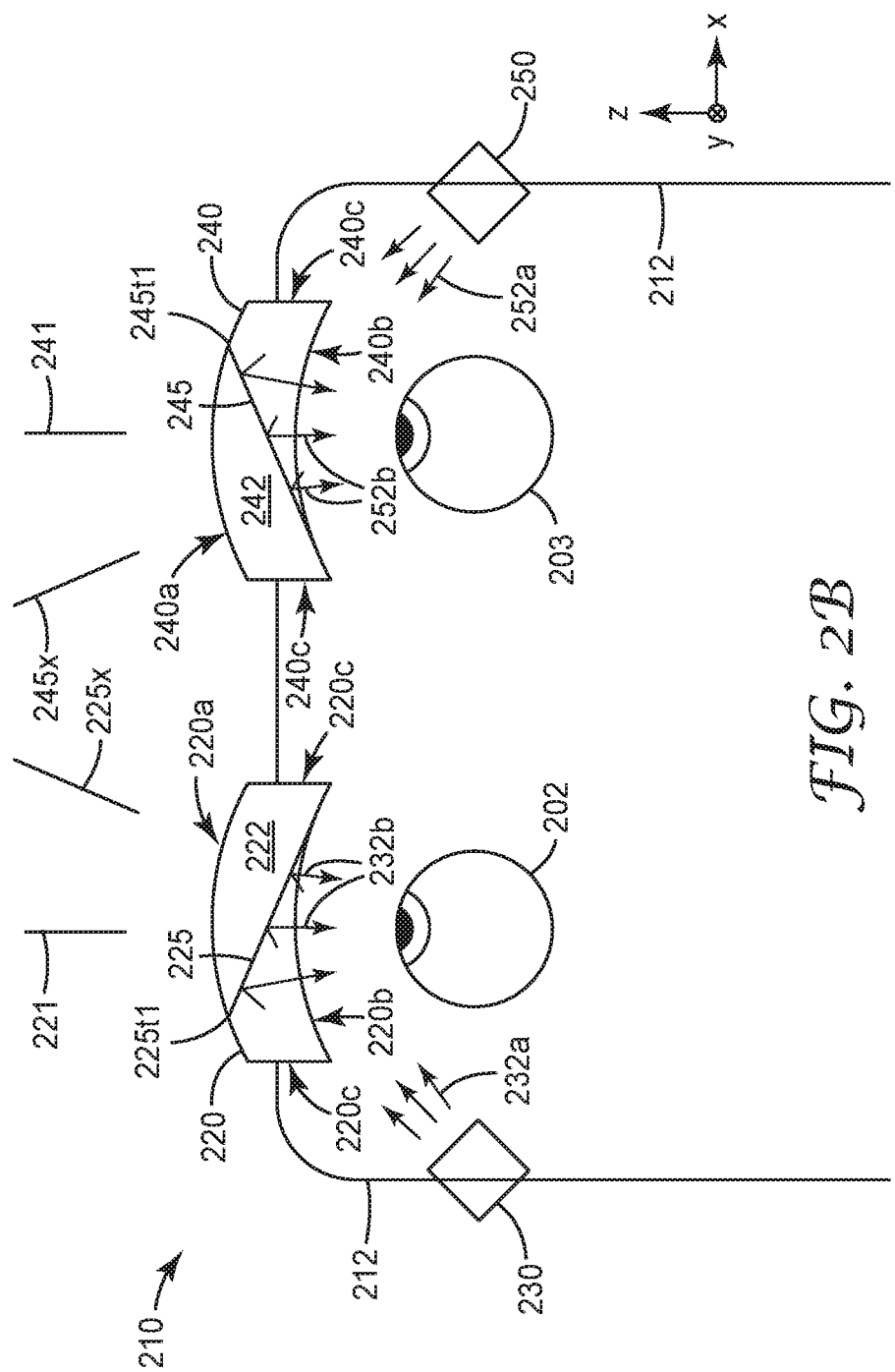

The eyewear 210 is shown in the context of light that provides the user with a world view (FIG. 2A) and light that provides the user with a projected view (FIG. 2B). In FIG. 2A, light 204a from a remote object impinges on the left lens 220, striking the first optical surface 220a. Some of this light passes through the lens, exiting the second optical surface 220b and entering the eye 202 as light 204b. At least some of the light that passes through the lens 220 is transmitted by the multilayer optical film 225, but at least some may not pass through the film 225 but instead may completely avoid the film 225 yet pass through the lens 220 by following a path that leads from the first optical surface 220a to the second optical surface 220b without traversing the film 225. Note that some of the light 204a may undergo Fresnel reflection at the first optical surface 220a, and some may be reflected, rather than transmitted, by the multilayer optical film 225. The right lens 240 may operate similarly to the left lens 220. Thus, light 205a from the remote object impinges on the right lens 240, striking the first optical surface 240a. Some of this light passes through the lens, exiting the second optical surface 240b and entering the eye 203 as light 205b. At least some of the light that passes through the lens 240 is transmitted by the multilayer optical film 245, but at least some may not pass through the film 245 but instead may completely avoid the film 245 yet pass through the lens 240 by following a path that leads from the first optical surface 240a to the second optical surface 240b without traversing the film 245. Some of the light 205a may undergo Fresnel reflection at the first optical surface 240a, and some may be reflected, rather than transmitted, by the multilayer optical film 245.

In FIG. 2B, the eyewear 210 is shown in the context of light that provides the user with a projected view, which is superimposed on the world view. Here, the imaging devices 230, 250 are energized and controlled to emit imaging light 232a, 252a respectively, towards the lenses 220, 240, respectively. At least some of this light enters the lens through the second optical surface (see surfaces 220b and 240b) and is reflected by the multilayer optical film (film 225 and film 245) without reaching the first optical surface (see surfaces 220a and 240a), whereupon the light exits the lens through the second optical surface (see surfaces 220b and 240b) and enters the eye (see eye 202 and eye 203) as light 232b and 252b, respectively.

As mentioned above, the embedded multilayer optical film in the disclosed lenses includes a plurality of polymer layers whose optical thicknesses are small enough, whose refractive indices are different enough along at least one axis, and whose arrangement into one or more stacks or packets of layers, is such that they cooperate with each other to selectively reflect light by constructive or destructive interference. Information on suitable or potentially suitable multilayer optical films can be found in: U.S. Pat. No. 5,486,949 (Schrenk et al.) "Birefringent Interference Polarizer"; U.S. Pat. No. 5,882,774 (Jonza et al.) "Optical Film"; U.S. Pat. No. 6,045,894 (Jonza et al.) "Clear to Colored Security Film"; U.S. Pat. No. 6,179,948 (Merrill et al.)

"Optical Film and Process for Manufacture Thereof"; U.S. Pat. No. 6,531,230 (Weber et al.) "Color Shifting Film"; U.S. Pat. No. 6,939,499 (Merrill et al.) "Processes and Apparatus for Making Transversely Drawn Films with Substantially Uniaxial Character"; U.S. Pat. No. 7,256,936 (Hebrink et al.) "Optical Polarizing Films with Designed Color Shifts"; U.S. Pat. No. 7,316,558 (Merrill et al.) "Devices for Stretching Polymer Films"; PCT Publication WO 2008/144136 A1 (Nevitt et al.) "Lamp-Hiding Assembly for a Direct Lit Backlight"; PCT Publication WO 2008/144656 A2 (Weber et al.) "Backlight and Display System Using Same". For convenience, we summarize in connection with FIGS. 3 and 4 some relevant aspects of suitable multilayer optical films that may be useful in the disclosed lenses.

Figure 3:
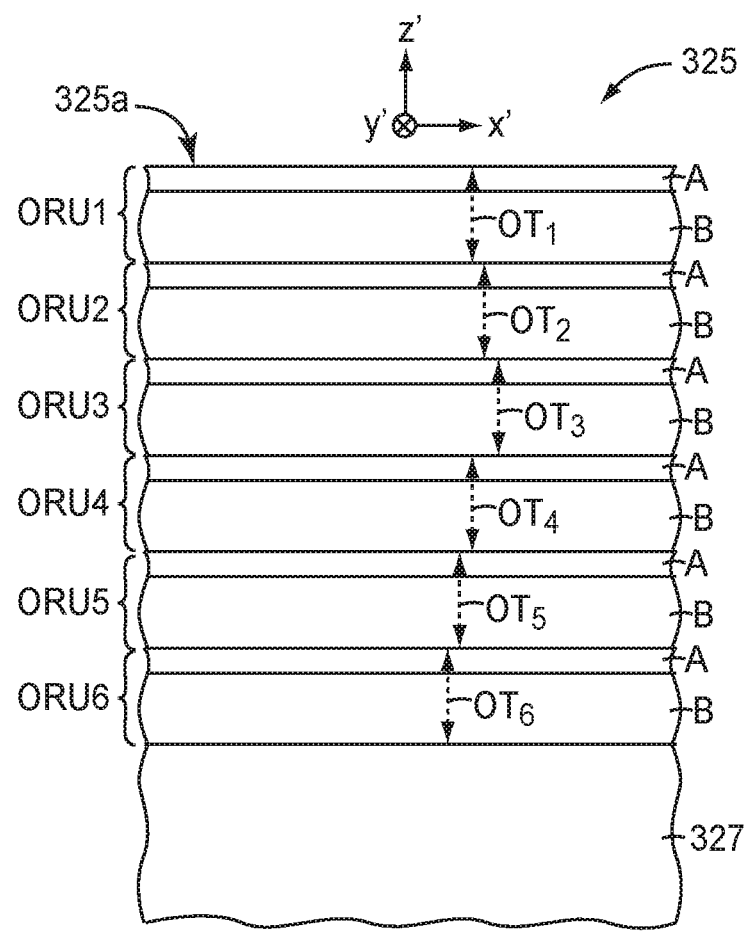
FIG. 3 is a schematic side or sectional view of a portion of a multilayer optical film.

FIG. 3 shows a schematic view of a typical multilayer optical film 325 in relation to its own Cartesian x'-y'-z' coordinate system, where the film 325 extends parallel to the x'- and y'-axes, and the z'-axis is perpendicular to the film and its constituent layers, and parallel to a thickness axis of the film. The film 325 need not be entirely flat, but may be curved or otherwise shaped to deviate from a plane, and even in those cases arbitrarily small portions or regions of the film can be associated with a local Cartesian coordinate system as shown.

The multilayer optical film 325 is partially reflective and partially light transmissive. In general, of course, transmission (T) plus reflection (R) plus absorption (A) equals one hundred percent, or T+R+A=100%. In exemplary embodiments, the film 325 is composed entirely of materials that have a low absorption over the wavelength spectrum of interest, e.g., over the visible spectrum. In such cases, the reflection and transmission over that spectral range take on a complementary relationship because T+R=100%−A, and since A is small, T+R≈100%. For such films, high reflectivity (e.g. at a given wavelength or for a given polarization state) is associated with low transmission, and low reflectivity is associated with high transmission.

Multilayer optical films include individual layers having different refractive indices so that some light is reflected at interfaces between adjacent layers. These layers, sometimes referred to as "microlayers", are sufficiently thin so that light reflected at a plurality of the interfaces undergoes constructive or destructive interference to give the multilayer optical film the desired reflective or transmissive properties. For multilayer optical films designed to reflect light at ultraviolet, visible, or near-infrared wavelengths, each microlayer generally has an optical thickness (a physical thickness multiplied by refractive index) of less than about 1 µm. However, thicker layers can also be included, such as skin layers at the outer surfaces of the multilayer optical film, or protective boundary layers (PBLs) disposed within the multilayer optical film to separate coherent groupings (known as "stacks" or "packets") of microlayers. In FIG. 3, the microlayers are labeled "A" or "B", the "A" layers being composed of one material and the "B" layers being composed of a different material, these layers being stacked in an alternating arrangement to form optical repeat units or unit cells ORU 1, ORU 2, . . . ORU 6 as shown. Typically, a multilayer optical film composed entirely of polymeric materials would include many more than 6 optical repeat units if high reflectivities are desired. The substantially thicker layer 327 at the bottom of the figure can represent an outer skin layer, or a PBL that separates the stack of microlayers shown in the figure from another stack or packet of microlayers (not shown). If desired, two or more separate multilayer optical films can be laminated together, e.g. with one or more thick adhesive layers, or using pressure, heat, or other methods to form a laminate or composite film.

With regard to adjacent microlayers within a stack of the multilayer optical film, we refer to the refractive indices of one of the microlayers (e.g. the "A" layers in FIG. 3) for light polarized along principal x'-, y'-, and z'-axes such as those shown in FIG. 3 as $n1x$, $n1y$, and $n1z$, respectively. We refer to the refractive indices of the adjacent microlayer (e.g. the "B" layers in FIG. 3) along the same axes as $n2x$, $n2y$, $n2z$, respectively. A layer of the multilayer optical film 325, or any material, is considered to be "birefringent" if the material has an anisotropic dielectric tensor over a wavelength range of interest, e.g., a selected wavelength or band in the UV, visible, and/or infrared portions of the spectrum. Stated differently, a material or layer is considered to be "birefringent" if the principal refractive indices of the material (e.g., $n1x$, $n1y$, $n1z$) are not all the same. At least some of the microlayers in at least one packet of the multilayer optical film 325 are birefringent, and in some cases, all or substantially all of the microlayers in the film 325 or in a packet thereof may be birefringent. With regard to any two adjacent microlayers in a packet (either or both of which may or may not be birefringent), we refer to differences in their respective refractive indices as $\Delta nx$ ($=n1x-n2x$) along the x'-direction, $\Delta ny$ ($=n1y-n2y$) along the y'-direction, and $\Delta nz$ ($=n1z-n2z$) along the z'-direction. The nature of these refractive index differences, in combination with the number of microlayers in the film (or in a given stack of the film) and their thickness distribution, controls the reflective and transmissive characteristics of the film (or of the given stack of the film) in a given zone.

For example, if adjacent microlayers have a large refractive index mismatch along one in-plane direction ($\Delta nx$ large) and a small refractive index mismatch along the orthogonal in-plane direction ($\Delta ny \approx 0$), the film or packet may behave as a reflective polarizer for normally incident light. Alternatively, if adjacent microlayers have a large refractive index mismatch along both in-plane axes ($\Delta nx$ large and $\Delta ny$ large), the film or packet may behave as an on-axis mirror. The optical wavelength band(s) over which the reflective polarizer or mirror reflects normally incident light is tailored by tailoring the layer thickness gradient of the microlayer stack. For obliquely incident light, the reflectivity of each interface between adjacent microlayers is influenced by the refractive indices of the microlayers along the z'-axis, i.e., along the thickness axis of the film 325. By appropriate materials selection of the microlayers, adjacent microlayers can be made to exhibit a refractive index match ($\Delta nz \approx 0$) or mismatch ($\Delta nz$ large) along the z-axis, and the mismatch $\Delta nz$ may in some cases be of the same polarity or sign as the in-plane refractive index mismatch(es), while in other cases the mismatch $\Delta nz$ may be of the opposite polarity or sign as the in-plane refractive index mismatch(es). Such tailoring of $\Delta nz$ plays a key role in whether the reflectivity of the p-polarized component of obliquely incident light increases, decreases, or remains the same with increasing incidence angle.

In some cases, the microlayers can have thicknesses and refractive index values corresponding to a ¼-wave stack, i.e., arranged in optical repeat units each having two adjacent microlayers of equal optical thickness (f-ratio=50%, the f-ratio being the ratio of the optical thickness of a constituent layer "A" to the optical thickness of the complete optical repeat unit), such optical repeat unit being effective to reflect by constructive interference light whose wavelength λ is twice the overall optical thickness of the optical repeat unit. In other cases, the optical thickness of the microlayers in an optical repeat unit may be different from each other, whereby the f-ratio is greater than or less than 50%. In the embodiment of FIG. 3, the "A" layers are depicted for generality as being thinner than the "B" layers. Each depicted optical repeat unit (ORU 1, ORU 2, etc.) has an optical thickness ($OT_1$, $OT_2$, etc.) equal to the sum of the optical thicknesses of its constituent "A" and "B" layer, and each optical repeat unit reflects light whose wavelength $\lambda$ is twice its overall optical thickness.

In some embodiments, the optical thicknesses of the optical repeat units in a layer stack may all be equal to each other, to provide a narrow reflection band of high reflectivity centered at a wavelength equal to twice the optical thickness of each optical repeat unit. A depiction of this is shown in the idealized graph of FIG. 4A, where curve 402 is a reflectivity spectrum of a multilayer optical film or microlayer packet thereof, the spectrum having a strong, narrow reflection band 402a in the green region of the visible wavelength spectrum. The reflection spectrum of a film containing three such packets, that differ in average layer thickness, is shown in FIG. 4B, where the curve 404 is an idealized reflectivity spectrum having strong, narrow reflection bands in the red (band 404c), green (band 404b), and blue (band 404a) region of the visible spectrum.

In other embodiments, the optical thicknesses of the optical repeat units may differ according to a thickness gradient along the z-axis or thickness direction of the film, whereby the optical thickness of the optical repeat units increases, decreases, or follows some other functional relationship as one progresses from one side of the stack (e.g. the top) to the other side of the stack (e.g. the bottom). Such thickness gradients can be used to provide a widened reflection band to provide substantially spectrally flat transmission and reflection of light over the extended wavelength band of interest, and also over all angles of interest. A depiction of this is shown in the idealized graph of FIG. 4C, where curve 406 extends broadly over the visible wavelength spectrum. In a variation of this approach, the layer thickness profile may be tailored to provide high reflectivity over a broad range of wavelengths but a low reflectivity, and high transmission, in one or more narrow transmission bands, e.g. in the red, green, and/or blue regions of the visible spectrum. Multilayer optical films that provide one or more such narrow transmission bands, or one or more narrow reflection bands (see FIGS. 4A and 4B), are referred to herein as notched reflectors or notched filters.

Figure 4A:
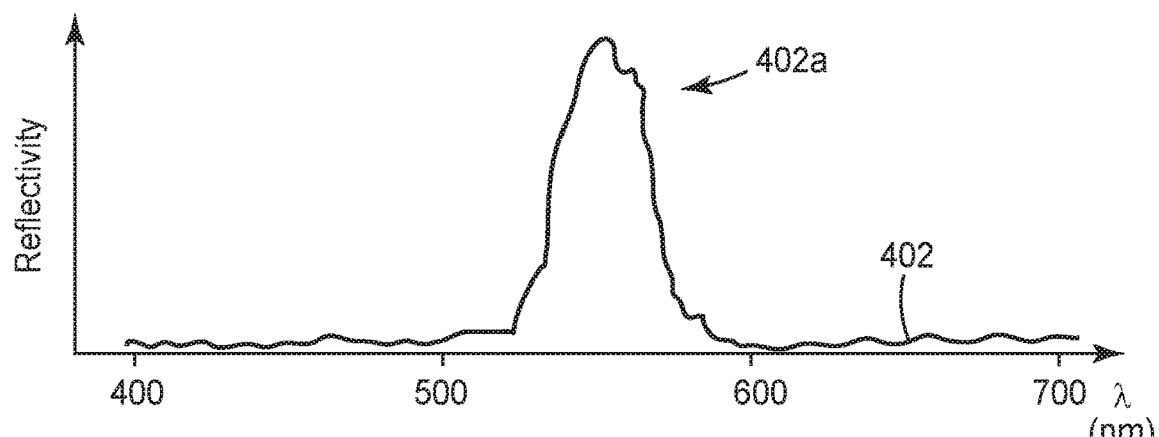
FIGS. 4A, 4B, and 4C are idealized, hypothetical graphs of reflectivity versus wavelength for various possible embodiments of the multilayer optical film.
Figure 4B:
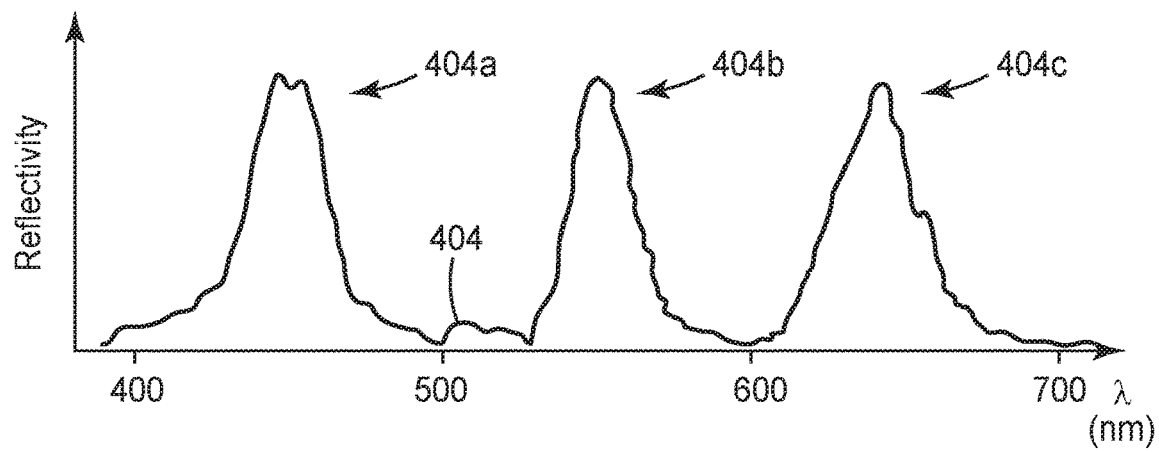
Figure 4C:
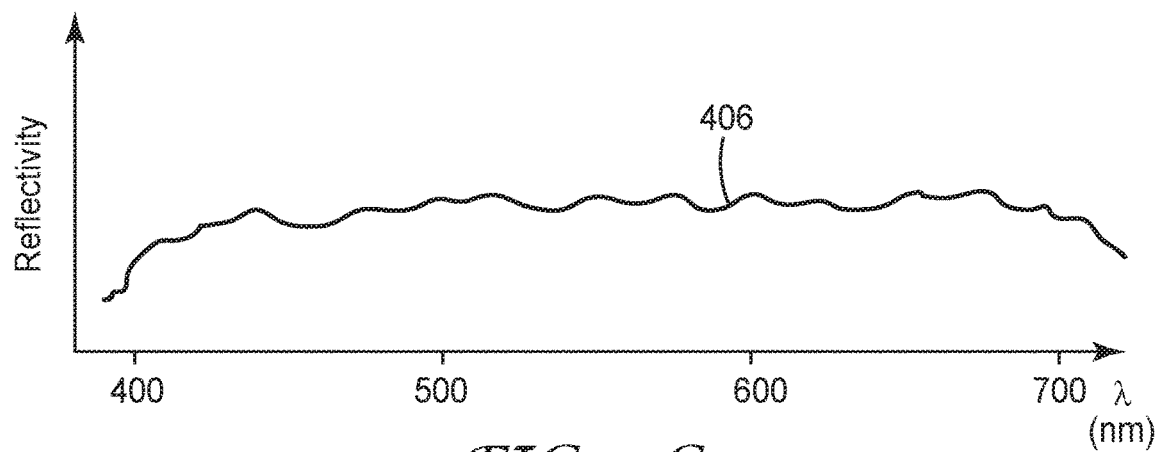

The spectral reflectivity characteristics described in the foregoing paragraphs, including those shown in FIGS. 4A through 4C, may be a feature of a multilayer optical film that reflects all polarizations, or of a multilayer optical film that reflects one polarization state and transmits the orthogonal polarization state. For example, a notched filter may be substantially polarization insensitive, reflecting two orthogonal polarization states within the reflection band(s) at normal incidence or at a design angle of incidence, or it may be polarization sensitive, reflecting only one polarization state and transmitting the orthogonal polarization state within the reflection band(s).

Thickness gradients tailored to sharpen the band edges at the wavelength transition between high reflection and high transmission can also be used, as discussed in U.S. Pat. No. 6,157,490 (Wheatley et al.) "Optical Film With Sharpened Bandedge". For polymeric multilayer optical films, reflection bands can be designed to have sharpened band edges as well as "flat top" reflection bands, in which the reflection properties are essentially constant across the wavelength range of application. Other layer arrangements, such as multilayer optical films having 2-microlayer optical repeat units whose f-ratio is different from 50%, or films whose optical repeat units include more than two microlayers, are also contemplated. These alternative optical repeat unit designs can be configured to reduce or to excite certain higher-order reflections, which may be useful if the desired reflection band resides in or extends to near infrared wavelengths. See, e.g., U.S. Pat. No. 5,103,337 (Schrenk et al.) "Infrared Reflective Optical Interference Film", U.S. Pat. No. 5,360,659 (Arends et al.) "Two Component Infrared Reflecting Film", U.S. Pat. No. 6,207,260 (Wheatley et al.) "Multicomponent Optical Body", and U.S. Pat. No. 7,019,905 (Weber) "Multi-layer Reflector With Suppression of High Order Reflections".

Exemplary multilayer optical films 325 are composed of polymer materials and may be fabricated using coextruding, casting, and orienting processes. Reference is made to U.S. Pat. No. 5,882,774 (Jonza et al.) "Optical Film", U.S. Pat. No. 6,179,948 (Merrill et al.) "Optical Film and Process for Manufacture Thereof", and U.S. Pat. No. 6,783,349 (Neavin et al.) "Apparatus for Making Multilayer Optical Films". The multilayer optical film may be formed by coextrusion of the polymers as described in any of the aforementioned references. The polymers of the various layers are preferably chosen to have similar rheological properties, e.g., melt viscosities, so that they can be co-extruded without significant flow disturbances. Extrusion conditions are chosen to adequately feed, melt, mix, and pump the respective polymers as feed streams or melt streams in a continuous and stable manner. Temperatures used to form and maintain each of the melt streams may be chosen to be within a range that avoids freezing, crystallization, or unduly high pressure drops at the low end of the temperature range, and that avoids material degradation at the high end of the range.

In brief summary, the fabrication method may comprise: (a) providing at least a first and a second stream of resin corresponding to the first and second polymers to be used in the finished film; (b) dividing the first and the second streams into a plurality of layers using a suitable feedblock, such as one that comprises: (i) a gradient plate comprising first and second flow channels, where the first channel has a cross-sectional area that changes from a first position to a second position along the flow channel, (ii) a feeder tube plate having a first plurality of conduits in fluid communication with the first flow channel and a second plurality of conduits in fluid communication with the second flow channel, each conduit feeding its own respective slot die, each conduit having a first end and a second end, the first end of the conduits being in fluid communication with the flow channels, and the second end of the conduits being in fluid communication with the slot die, and (iii) optionally, an axial rod heater located proximal to said conduits; (c) passing the composite stream through an extrusion die to form a multilayer web in which each layer is generally parallel to the major surface of adjacent layers; and (d) casting the multilayer web onto a chill roll, sometimes referred to as a casting wheel or casting drum, to form a cast multilayer film. This cast film may have the same number of layers as the finished film, but the layers of the cast film are typically much thicker than those of the finished film. Furthermore, the layers of the cast film are typically all isotropic.

Many alternative methods of fabricating the cast multilayer web can also be used. One such alternative method that also utilizes polymer coextrusion is described in U.S. Pat. No. 5,389,324 (Lewis et al.).

After cooling, the multilayer web can be drawn or stretched to produce the near-finished multilayer optical film, details of which can be found in the references cited above. The drawing or stretching accomplishes two goals: it thins the layers to their desired final thicknesses, and it orients the layers such that at least some of the layers become birefringent. The orientation or stretching can be accomplished along the cross-web direction (e.g. via a tenter), along the down-web direction (e.g. via a length orienter), or any combination thereof, whether simultaneously or sequentially. If stretched along only one direction, the stretch can be "unconstrained" (wherein the film is allowed to dimensionally relax in the in-plane direction perpendicular to the stretch direction) or "constrained" (wherein the film is constrained and thus not allowed to dimensionally relax in the in-plane direction perpendicular to the stretch direction). If stretched along both in-plane directions, the stretch can be symmetric, i.e., equal along the orthogonal in-plane directions, or asymmetric. Alternatively, the film may be stretched in a batch process. In any case, subsequent or concurrent draw reduction, stress or strain equilibration, heat setting, and other processing operations can also be applied to the film.

The multilayer optical film 325 can also include additional layers and coatings, and other additives, selected for their optical, mechanical, and/or chemical properties. For example, a UV absorbing layer can be added at one or both major outer surfaces of the film. See, e.g., U.S. Pat. No. 6,368,699 (Gilbert et al.).

The selective reflection provided by the multilayer optical film 325 allows some light, e.g., visible light from the imaging device, to be reflected so the user can perceive the projected view, while simultaneously allowing other light, e.g. a complementary spectrum or complementary polarization state of visible light from remote objects on the opposite side of the lens, to be transmitted so the user can perceive the world view.

The lenses and systems described herein can have a variety of configurations and features. FIGS. 5A through 15 schematically depict some of these configurations and features.

Figure 5A:
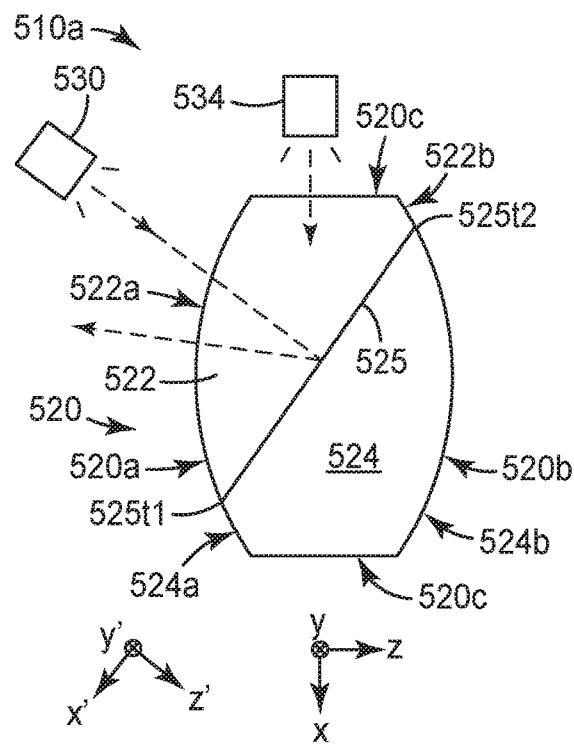
FIGS. 5A through 5C are schematic side or sectional views of systems in which an imaging device injects imaging light into a lens having an embedded multilayer optical film.
Figure 5B:
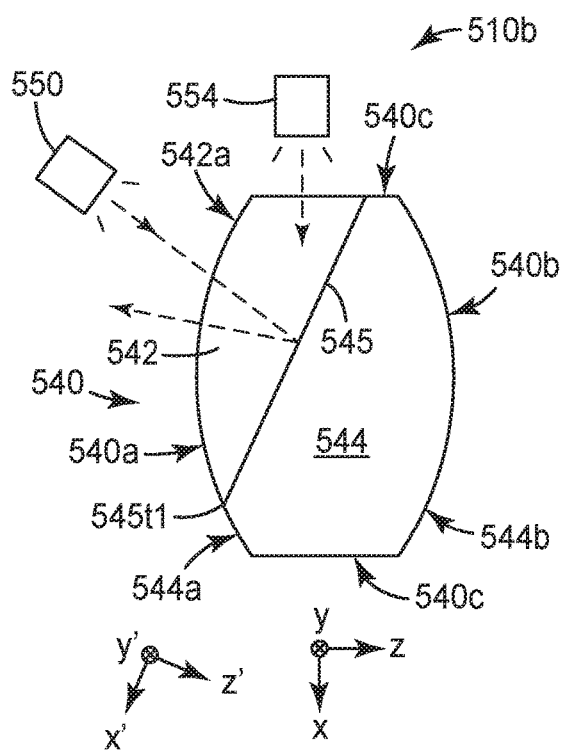
Figure 5C:
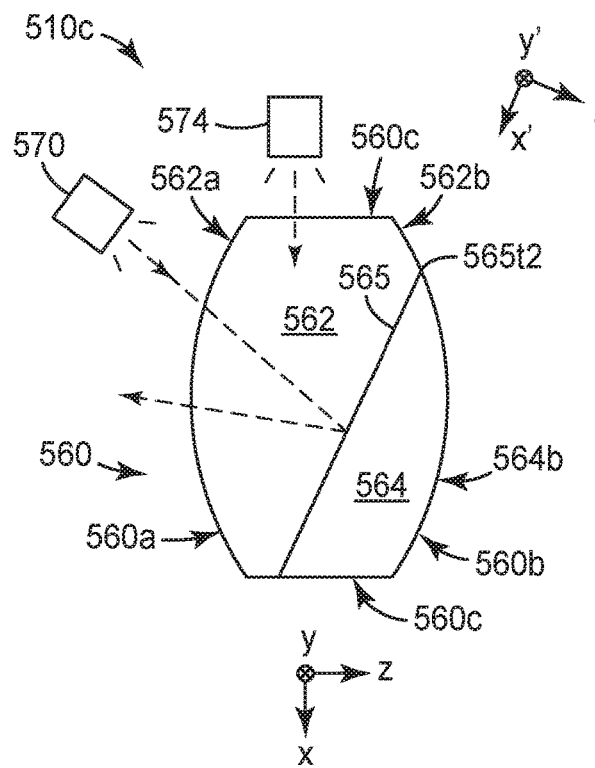

FIGS. 5A through 5C depict various systems in which an imaging device injects imaging light into a lens having an embedded multilayer optical film. In these figures, two imaging devices are shown to illustrate different possible placements or orientations of the imaging device relative to the lens. Design aspects of the lenses may be the same as or similar to the lens 120 of FIG. 1, except as noted, and design aspects of the imaging devices may be the same as or similar to the imaging device 130 of FIG. 1, except as noted.

In FIG. 5A, a system 510a includes a lens 520 and imaging devices 530, 534. The lens 520 has an optical axis parallel to the z-axis of an x-y-z Cartesian coordinate system. The lens has first and second opposed optical surfaces 520a, 520b, and a circumferential surface 520c that connects the optical surfaces. The lens 520 also includes a first lens section 522, a second lens section 524, and a multilayer optical film 525. The film 525 is sandwiched between mating surfaces of the lens sections 522, 524, which may attach to each other through the film 525. The first lens section 522 has first and second smooth surfaces 522a, 522b, and the second lens section 524 has first and second smooth surfaces 524a, 524b. The first optical surface 520a of the lens is convex and includes the first smooth surfaces 522a, 524a. The second optical surface 520b of the lens is also convex and includes the second smooth surfaces 522b, 524b. The multilayer optical film 525 partially reflects and partially transmits light as described above, and lies in the x'-y' plane of an x'-y'-z' Cartesian coordinate system which is rotated or tilted relative to the x-y-z coordinate system. The amount of tilt or rotation is such that the film 525 intersects both the first optical surface 520a and the second optical surface 520b. At the first optical surface, the film 525 terminates along an extended terminus 525t1, which separates the first smooth surface 522a from the first smooth surface 524a. At the second optical surface, the film 525 terminates along an extended terminus 525t2, which separates the second smooth surface 522b from the second smooth surface 524b. The imaging device may be positioned to inject imaging light into the lens through the first optical surface 520a (see imaging device 530), or it may be positioned to inject imaging light through the circumferential surface 520c (see imaging device 534). In either case, the multilayer optical film 525 reflects some of the imaging light out through the first optical surface 520a to an eye of the user.

In FIG. 5B, a system 510b includes a lens 540 and imaging devices 550, 554. The lens 540 has an optical axis parallel to the z-axis of an x-y-z Cartesian coordinate system. The lens has first and second opposed optical surfaces 540a, 540b, and a circumferential surface 540c that connects the optical surfaces. The lens 540 also includes a first lens section 542, a second lens section 544, and a multilayer optical film 545. The film 545 is sandwiched between mating surfaces of the lens sections 542, 544, which may attach to each other through the film 545. The first lens section 542 has a first smooth surface 542a, and the second lens section 544 has first and second smooth surfaces 544a, 544b. The first optical surface 540a of the lens is convex and includes the first smooth surfaces 542a, 544a. The second optical surface 540b of the lens is also convex and coincides with the second smooth surface 544b. The multilayer optical film 545 partially reflects and partially transmits light as described above, and lies in the x'-y' plane of an x'-y'-z' Cartesian coordinate system which is rotated or tilted relative to the x-y-z coordinate system. The amount of tilt or rotation is such that the film 545 intersects the first optical surface 540a and the circumferential surface 540c, but not the second optical surface 540b. At the first optical surface, the film 545 terminates along an extended terminus 545t1, which separates the first smooth surface 542a from the first smooth surface 544a. The imaging device may be positioned to inject imaging light into the lens through the first optical surface 540a (see imaging device 550), or it may be positioned to inject imaging light through the circumferential surface 540c (see imaging device 554). In either case, the multilayer optical film 545 reflects some of the imaging light out through the first optical surface 540a to an eye of the user.

In FIG. 5C, a system 510c includes a lens 560 and imaging devices 570, 574. The lens 560 has an optical axis parallel to the z-axis of an x-y-z Cartesian coordinate system. The lens has first and second opposed optical surfaces 560a, 560b, and a circumferential surface 560c that connects the optical surfaces. The lens 560 also includes a first lens section 562, a second lens section 564, and a multilayer optical film 565. The film 565 is sandwiched between mating surfaces of the lens sections 562, 564, which may attach to each other through the film 565. The first lens section 562 has first and second smooth surfaces 562a, 562b, and the second lens section 524 has a second smooth surface 564b. The first optical surface 560a of the lens is convex and coincides with the first smooth surface 562a. The second optical surface 560b of the lens is also convex and includes the second smooth surfaces 562*b*, 564*b*. The multilayer optical film 565 partially reflects and partially transmits light as described above, and lies in the x'-y' plane of an x'-y'-z' Cartesian coordinate system which is rotated or tilted relative to the x-y-z coordinate system. The amount of tilt or rotation is such that the film 565 intersects both the second optical surface 560*b* and the circumferential surface 560*c*, but not the first optical surface 560*a*. At the second optical surface, the film 565 terminates along an extended terminus 565*t*2, which separates the second smooth surface 562*b* from the second smooth surface 564*b*. The imaging device may be positioned to inject imaging light into the lens through the first optical surface 560*a* (see imaging device 570), or it may be positioned to inject imaging light through the circumferential surface 560*c* (see imaging device 574). In either case, the multilayer optical film 565 reflects some of the imaging light out through the first optical surface 560*a* to an eye of the user.

Figure 6:
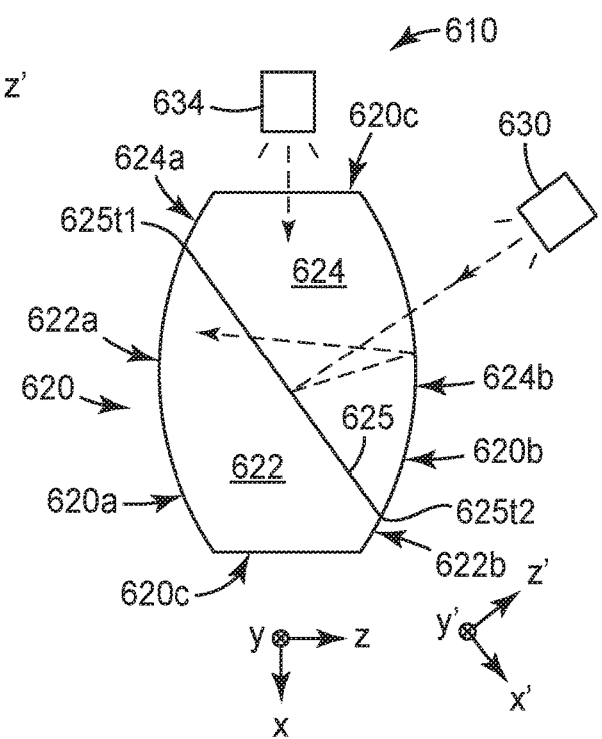
FIG. 6 is a schematic side or sectional view of another system in which an imaging device injects imaging light into a lens having an embedded multilayer optical film.

FIG. 6 depicts a system which uses a folded optical path for the imaging light. In this figure, a system 610*a* includes a lens 620 and imaging devices 630, 634. The lens 620 has an optical axis parallel to the z-axis of an x-y-z Cartesian coordinate system. The lens has first and second opposed optical surfaces 620*a*, 620*b*, and a circumferential surface 620*c* that connects the optical surfaces. The lens 620 also includes a first lens section 622, a second lens section 624, and a multilayer optical film 625. The film 625 is sandwiched between mating surfaces of the lens sections 622, 624, which may attach to each other through the film 625. The first lens section 622 has first and second smooth surfaces 622*a*, 622*b*, and the second lens section 624 has first and second smooth surfaces 624*a*, 624*b*. The first optical surface 620*a* of the lens is convex and includes the first smooth surfaces 622*a*, 624*a*. The second optical surface 620*b* of the lens is also convex and includes the second smooth surfaces 622*b*, 624*b*. The multilayer optical film 625 partially reflects and partially transmits light as described above, and lies in the x'-y' plane of an x'-y'-z' Cartesian coordinate system which is rotated or tilted relative to the x-y-z coordinate system. The amount of tilt or rotation is such that the film 625 intersects both the first optical surface 620*a* and the second optical surface 620*b*. At the first optical surface, the film 625 terminates along an extended terminus 625*t*1, which separates the first smooth surface 622*a* from the first smooth surface 624*a*. At the second optical surface, the film 625 terminates along an extended terminus 625*t*2, which separates the second smooth surface 622*b* from the second smooth surface 624*b*. The imaging device may be positioned to inject imaging light into the lens through the second optical surface 620*b* (see imaging device 630), or it may be positioned to inject imaging light through the circumferential surface 620*c* (see imaging device 634). In either case, the multilayer optical film 625 is oriented to reflect some of the imaging light to the second optical surface 620*b* where it is partially reflected, then partially transmitted back through the film 625, and exits the lens 620 through the first optical surface 620*a* to an eye of the user. If desired, a partial reflector such as a thin partially transparent metal layer, a dielectric layer having a different refractive index than the surrounding media, and/or a partially reflective dielectric stack comprising multiple layers of high and low refractive index materials, can be disposed on at least a part of the second optical surface 620*b* to increase the reflectivity of the imaging light while also allowing light from remote objects to pass through the lens 620.

Figure 7:
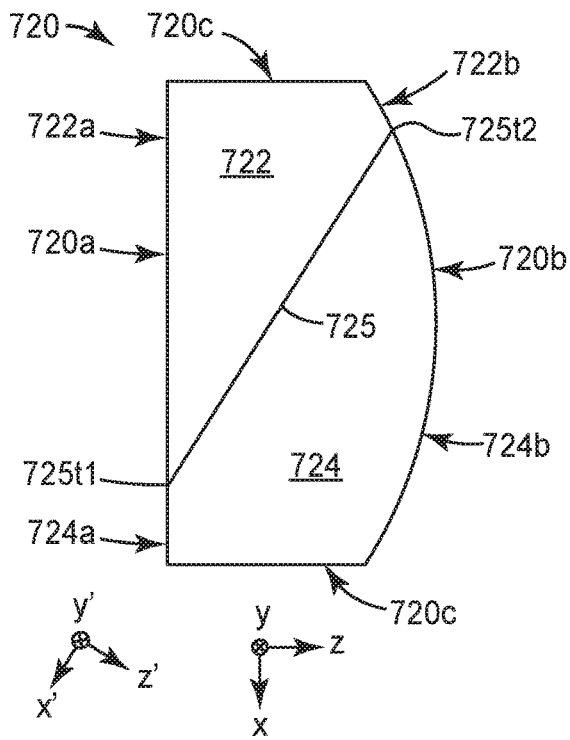
FIGS. 7 and 8 are schematic side or sectional views of more lenses having embedded multilayer optical films.
Figure 8:
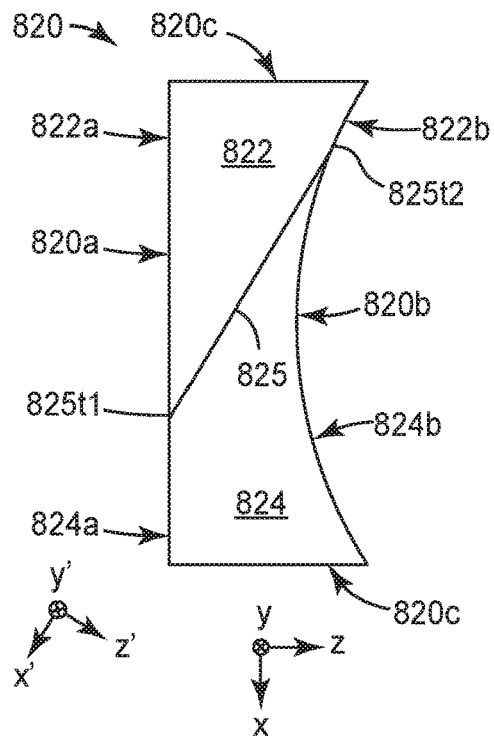
Figure 9:
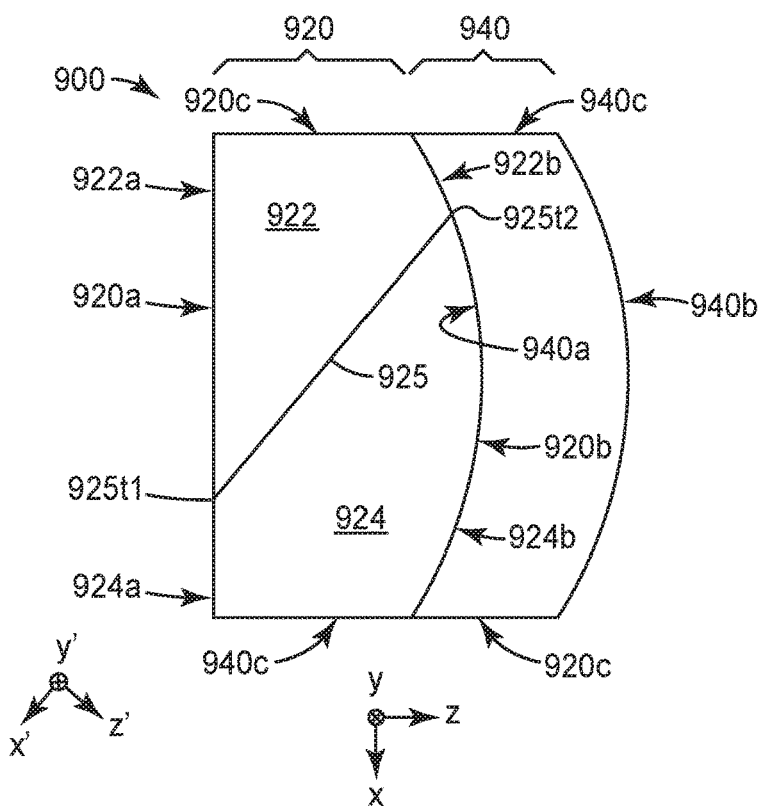
FIG. 9 is a schematic side or sectional view of a compound lens in which one of the component lenses has an embedded multilayer optical film.

FIGS. 7 through 9 show still more lens configurations. In FIG. 7, a lens 720 has an optical axis parallel to the z-axis of an x-y-z Cartesian coordinate system. The lens has first and second opposed optical surfaces 720*a*, 720*b*, and a circumferential surface 720*c* that connects the optical surfaces. The lens 720 also includes a first lens section 722, a second lens section 724, and a multilayer optical film 725. The film 725 is sandwiched between mating surfaces of the lens sections 722, 724, which may attach to each other through the film 725. The first lens section 722 has first and second smooth surfaces 722*a*, 722*b*, and the second lens section 724 has first and second smooth surfaces 724*a*, 724*b*. The first optical surface 720*a* of the lens is flat and includes the first smooth surfaces 722*a*, 724*a*. The second optical surface 720*b* of the lens is convex and includes the second smooth surfaces 722*b*, 724*b*. The multilayer optical film 725 partially reflects and partially transmits light as described above, and lies in the x'-y' plane of an x'-y'-z' Cartesian coordinate system which is rotated or tilted relative to the x-y-z coordinate system. The amount of tilt or rotation is such that the film 725 intersects both the first optical surface 720*a* and the second optical surface 720*b*. At the first optical surface, the film 725 terminates along an extended terminus 725*t*1, which separates the first smooth surface 722*a* from the first smooth surface 724*a*. At the second optical surface, the film 725 terminates along an extended terminus 725*t*2, which separates the second smooth surface 722*b* from the second smooth surface 724*b*. An imaging device (not shown) may be positioned to inject imaging light into the lens through the first optical surface 720*a*, or it may be positioned to inject imaging light through the circumferential surface 720*c*. In either case, the multilayer optical film 725 reflects some of the imaging light out through the first optical surface 720*a* to an eye of the user.

In FIG. 8, a lens 820 has an optical axis parallel to the z-axis of an x-y-z Cartesian coordinate system. The lens has first and second opposed optical surfaces 820*a*, 820*b*, and a circumferential surface 820*c* that connects the optical surfaces. The lens 820 also includes a first lens section 822, a second lens section 824, and a multilayer optical film 825. The film 825 is sandwiched between mating surfaces of the lens sections 822, 824, which may attach to each other through the film 825. The first lens section 822 has first and second smooth surfaces 822*a*, 822*b*, and the second lens section 824 has first and second smooth surfaces 824*a*, 824*b*. The first optical surface 820*a* of the lens is flat and includes the first smooth surfaces 822*a*, 824*a*. The second optical surface 820*b* of the lens is concave and includes the second smooth surfaces 822*b*, 824*b*. The multilayer optical film 825 partially reflects and partially transmits light as described above, and lies in the x'-y' plane of an x'-y'-z' Cartesian coordinate system which is rotated or tilted relative to the x-y-z coordinate system. The amount of tilt or rotation is such that the film 825 intersects both the first optical surface 820*a* and the second optical surface 820*b*. At the first optical surface, the film 825 terminates along an extended terminus 825*t*1, which separates the first smooth surface 822*a* from the first smooth surface 824*a*. At the second optical surface, the film 825 terminates along an extended terminus 825*t*2, which separates the second smooth surface 822*b* from the second smooth surface 824*b*. An imaging device (not shown) may be positioned to inject imaging light into the lens through the first optical surface 820*a*, or it may be positioned to inject imaging light through the circumferential surface 820*c*. In either case, the multilayer optical film 825 reflects some of the imaging light out through the first optical surface 820*a* to an eye of the user.

In FIG. 9, a compound lens 900 includes a lens 920 cemented or otherwise joined to another lens 940. The lens 920, as well as the compound lens 900 and the other lens 940, has an optical axis parallel to the z-axis of an x-y-z Cartesian coordinate system. The lens 920 has first and second opposed optical surfaces 920a, 920b, and a circumferential surface 920c that connects the optical surfaces. (Similarly, the lens 940 has first and second opposed optical surfaces 940a, 940b, and a circumferential surface 940c that connects the optical surfaces. The first optical surface 940a of the lens 940 is shaped to mate with the second optical surface 920b of the lens 920.) The lens 920 includes a first lens section 922, a second lens section 924, and a multilayer optical film 925. The film 925 is sandwiched between mating surfaces of the lens sections 922, 924, which may attach to each other through the film 925. The first lens section 922 has first and second smooth surfaces 922a, 922b, and the second lens section 924 has first and second smooth surfaces 924a, 924b. The first optical surface 920a of the lens 920 is flat and includes the first smooth surfaces 922a, 924a. The second optical surface 920b of the lens 920 is convex and includes the second smooth surfaces 922b, 924b. The multilayer optical film 925 partially reflects and partially transmits light as described above, and lies in the x'-y' plane of an x'-y'-z' Cartesian coordinate system which is rotated or tilted relative to the x-y-z coordinate system. The amount of tilt or rotation is such that the film 925 intersects both the first optical surface 920a and the second optical surface 920b. At the first optical surface, the film 925 terminates along an extended terminus 925t1, which separates the first smooth surface 922a from the first smooth surface 924a. At the second optical surface, the film 925 terminates along an extended terminus 925t2, which separates the second smooth surface 922b from the second smooth surface 924b. An imaging device (not shown) may be positioned to inject imaging light into the lens through the first optical surface 920a, or it may be positioned to inject imaging light through the circumferential surface 920c. In either case, the multilayer optical film 925 reflects some of the imaging light out through the first optical surface 920a to an eye of the user.

Figure 10:
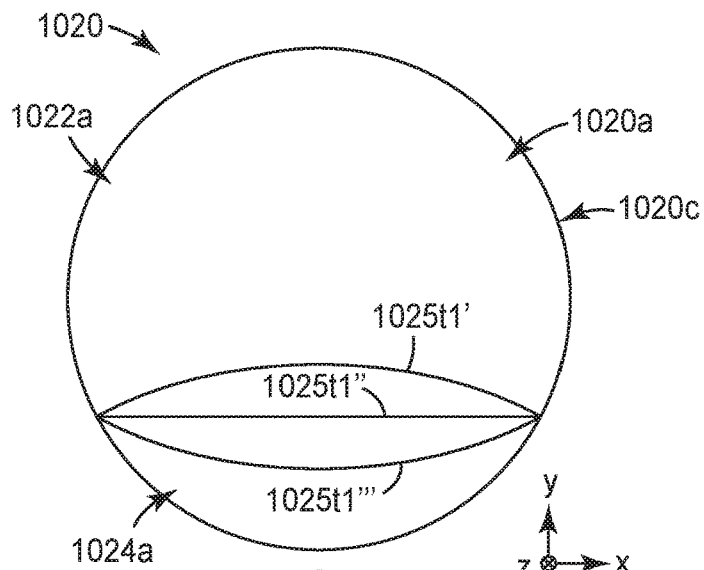
FIG. 10 is a schematic front view of a lens having an embedded multilayer optical film, the multilayer optical film having an extended terminus disposed at or near an optical surface of the lens.
Figure 11:
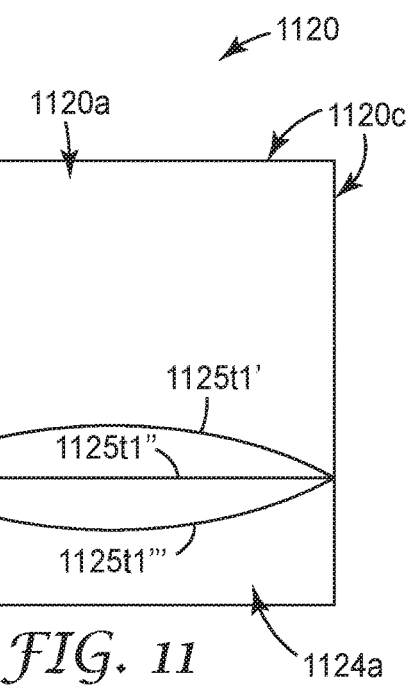
FIGS. 11 and 12 are schematic front views of lenses having alternative circumferential shapes.
Figure 12:
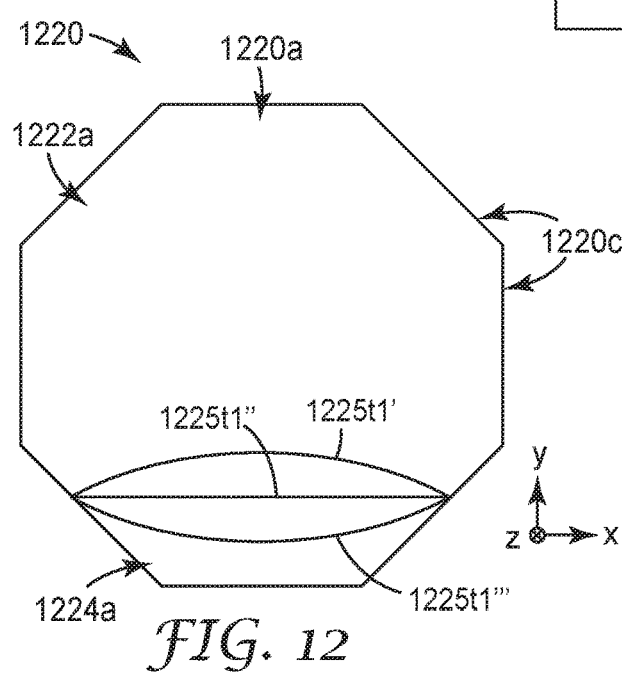

FIGS. 10 through 12 depict front or plan views of representative lenses so that different possible shapes of the extended terminus of the multilayer optical film, as well as the outer periphery or circumference of the lens, can be better seen and discussed. In FIG. 10, a lens 1020 may be the same as or similar to lenses discussed elsewhere herein. The lens 1020 has an optical axis parallel to the z-axis of an x-y-z Cartesian coordinate system. The lens 1020 has a first optical surface 1020a, an opposed second optical surface, and a circumferential surface 1020c that connects the optical surfaces. The circumferential surface 1020c is substantially circular. The lens 1020 includes a first lens section, a second lens section, and a multilayer optical film sandwiched between mating surfaces of the lens sections. The first lens section has a first smooth surface 1022a, and the second lens section also has a first smooth surface 1024a. The first optical surface 1020a includes the first smooth surfaces 1022a, 1024a. The multilayer optical film partially reflects and partially transmits light as described above, and lies in a plane that is rotated or tilted relative to the x-y plane. The amount of tilt or rotation is such that the film intersects at least the first optical surface 1020a. At the first optical surface, the film terminates along an extended terminus, which separates the first smooth surface 1022a from the first smooth surface 1024a. The shape and appearance of the extended terminus depends on the shape of the multilayer optical film, e.g., whether it is flat and planar or curved or otherwise non-flat, and on the shape of the first optical surface 1020a, e.g. whether it is flat, concave, or convex. Three alternative extended terminuses are shown in the figure for the case where the multilayer optical film is flat: arc-shaped extended terminus 1025t1' is for a case where the first optical surface 1020a is concave, straight extended terminus 1025t1" is for a case where the first optical surface 1020a is flat, and arc-shaped extended terminus 1025t1''' is for a case where the first optical surface 1020a is convex. In cases where the shape of the multilayer optical film deviates from a flat plane, the plan view shape of the extended terminus will deviate from those depicted in FIG. 10.

FIG. 11 depicts a lens 1120 that may be the same as or similar to that of FIG. 10, except that the outer periphery or circumference of the lens is substantially square or rectangular. Thus, the lens 1120 has an optical axis parallel to the z-axis of an x-y-z Cartesian coordinate system. The lens 1120 also has a first optical surface 1120a, an opposed second optical surface, and a circumferential surface 1120c that connects the optical surfaces. The circumferential surface 1120c is substantially square in shape. The lens 1120 includes a first lens section, a second lens section, and a multilayer optical film sandwiched between mating surfaces of the lens sections. The first lens section has a first smooth surface 1122a, and the second lens section also has a first smooth surface 1124a. The first optical surface 1120a includes the first smooth surfaces 1122a, 1124a. The multilayer optical film partially reflects and partially transmits light as described above, and lies in a plane that is rotated or tilted relative to the x-y plane. The amount of tilt or rotation is such that the film intersects at least the first optical surface 1120a. At the first optical surface, the film terminates along an extended terminus, which separates the first smooth surface 1122a from the first smooth surface 1124a. The shape and appearance of the extended terminus depends on the shape of the multilayer optical film, e.g., whether it is flat and planar or curved or otherwise non-flat, and on the shape of the first optical surface 1120a, e.g. whether it is flat, concave, or convex. Three alternative extended terminuses are shown in the figure for the case where the multilayer optical film is flat: arc-shaped extended terminus 1125t1' is for a case where the first optical surface 1120a is concave, straight extended terminus 1125t1" is for a case where the first optical surface 1120a is flat, and arc-shaped extended terminus 1125t1''' is for a case where the first optical surface 1120a is convex. In cases where the shape of the multilayer optical film deviates from a flat plane, the plan view shape of the extended terminus will deviate from those depicted in FIG. 11.

FIG. 12 depicts a lens 1220 that may be the same as or similar to that of FIGS. 10 and 11, except that the outer periphery or circumference of the lens is substantially octagonal. Thus, the lens 1220 has an optical axis parallel to the z-axis of an x-y-z Cartesian coordinate system. The lens 1220 also has a first optical surface 1220a, an opposed second optical surface, and a circumferential surface 1220c that connects the optical surfaces. The circumferential surface 1220c is substantially octagonal in shape. The lens 1220 includes a first lens section, a second lens section, and a multilayer optical film sandwiched between mating surfaces of the lens sections. The first lens section has a first smooth surface 1222a, and the second lens section also has a first smooth surface 1224a. The first optical surface 1220a includes the first smooth surfaces 1222a, 1224a. The multilayer optical film partially reflects and partially transmits light as described above, and lies in a plane that is rotated or tilted relative to the x-y plane. The amount of tilt or rotation is such that the film intersects at least the first optical surface 1220a. At the first optical surface, the film terminates along an extended terminus, which separates the first smooth surface 1222a from the first smooth surface 1224a. The shape and appearance of the extended terminus depends on the shape of the multilayer optical film, e.g., whether it is flat and planar or curved or otherwise non-flat, and on the shape of the first optical surface 1220a, e.g. whether it is flat, concave, or convex. Three alternative extended terminuses are shown in the figure for the case where the multilayer optical film is flat: arc-shaped extended terminus 1225t1' is for a case where the first optical surface 1220a is concave, straight extended terminus 1225t1" is for a case where the first optical surface 1220a is flat, and arc-shaped extended terminus 1225t1''' is for a case where the first optical surface 1220a is convex. In cases where the shape of the multilayer optical film deviates from a flat plane, the plan view shape of the extended terminus will deviate from those depicted in FIG. 12.

Figure 13:
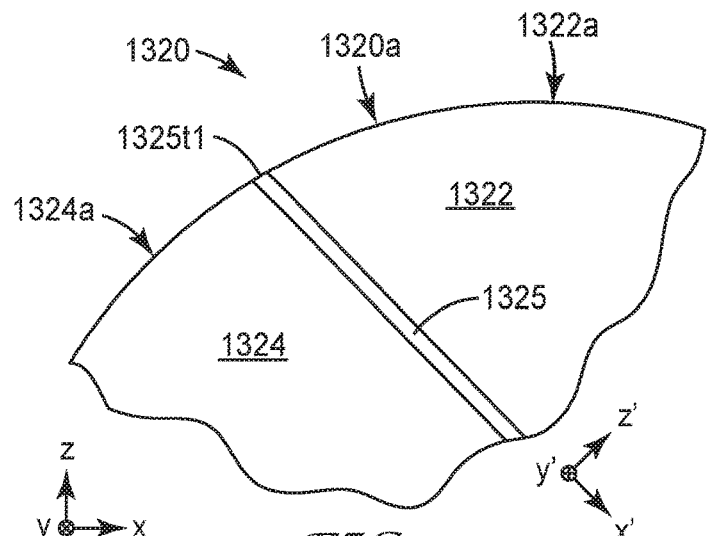
FIGS. 13, 14, and 15 are schematic sectional views of portions of lenses in which a multilayer optical film is sandwiched between two lens sections, and a terminus of the multilayer optical film is disposed at or near a curved optical surface of the lens.
Figure 14:
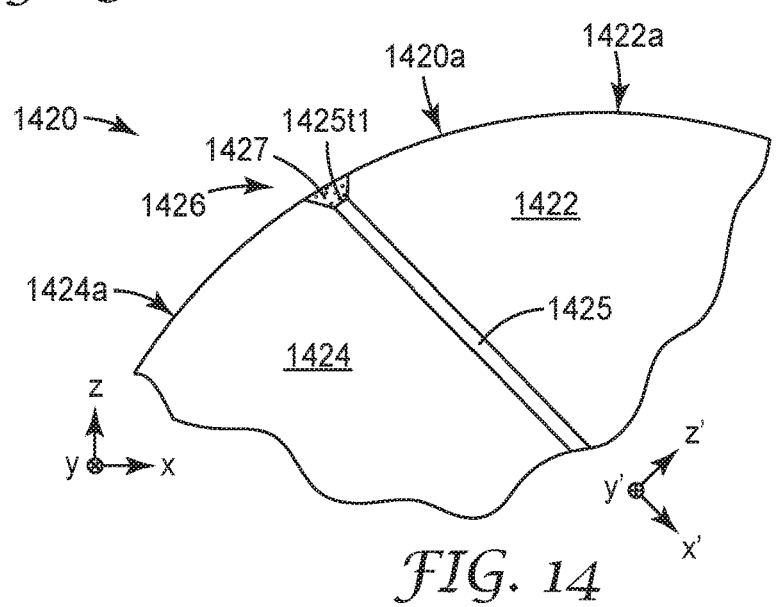
Figure 15:
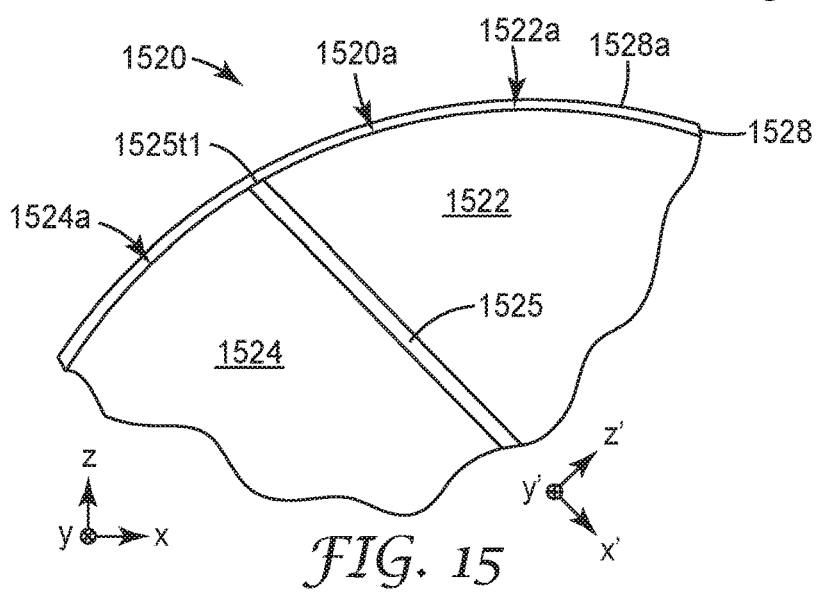

FIGS. 13 through 15 are schematic sectional views which are enlarged or magnified to show details of the optical surface of the lens in the vicinity of the extended terminus of the embedded multilayer optical film. The optical surface of the lens is shown as convex, but it may alternatively be flat, or concave. In FIG. 13, a lens 1320 may be the same as or similar to lenses discussed elsewhere herein. The lens 1320 has an optical axis parallel to the z-axis of an x-y-z Cartesian coordinate system. The lens has a first optical surface 1320a connected to an opposed second optical surface by a circumferential surface. The lens 1320 also includes a first lens section 1322, a second lens section 1324, and a multilayer optical film 1325. The film 1325 is sandwiched between mating surfaces of the lens sections 1322, 1324. The first lens section 1322 has a first smooth surface 1322a, and the second lens section 1324 has a first smooth surface 1324a. The first optical surface 1320a of the lens is convex and includes the first smooth surfaces 1322a, 1324a. The multilayer optical film 1325 partially reflects and partially transmits light as described above, and lies in the x'-y' plane of an x'-y'-z' Cartesian coordinate system which is rotated or tilted relative to the x-y-z coordinate system. The amount of tilt or rotation is such that the film 1325 intersects at least the first optical surface 1320a. At the first optical surface, the film 1325 terminates along an extended terminus 1325t1, which separates the first smooth surface 1322a from the first smooth surface 1324a.

The edge or terminus 1325t1 of the multilayer optical film 1325 may be cut and mechanically polished to form a smooth surface disposed to be in substantial registration with the smooth surfaces 1322a, 1324a, such that the terminus 1325t1 also forms part of the optical surface 1320a. The cutting and polishing is carried out carefully to avoid damaging the edge of the film 1325, thus reducing the chance that breaks, cracks, delaminations, or other edge defects may form at or near the terminus of the film.

In FIG. 14, a lens 1420 may be the same as or similar to the lens of FIG. 13, except that the terminus of the multilayer optical film lies in a notch or groove near the optical surface. The lens 1420 thus has an optical axis parallel to the z-axis of an x-y-z Cartesian coordinate system. The lens has a first optical surface 1420a connected to an opposed second optical surface by a circumferential surface. The lens 1420 also includes a first lens section 1422, a second lens section 1424, and a multilayer optical film 1425. The film 1425 is sandwiched between mating surfaces of the lens sections 1422, 1424. The first lens section 1422 has a first smooth surface 1422a, and the second lens section 1424 has a first smooth surface 1424a. The first optical surface 1420a of the lens is convex and includes the first smooth surfaces 1422a, 1424a. The multilayer optical film 1425 partially reflects and partially transmits light as described above, and lies in the x'-y' plane of an x'-y'-z' Cartesian coordinate system which is rotated or tilted relative to the x-y-z coordinate system. The amount of tilt or rotation is such that the film 1425 intersects at least the first optical surface 1420a. Near the first optical surface, the film 1425 terminates along an extended terminus 1425t1, which lies in an extended notch or groove 1426 and separates the first smooth surface 1422a from the first smooth surface 1424a. The notch 1426 is typically no more than 250 microns deep, or no more than 100 microns deep, and may have a width in a range from 100 to 250 microns, but these values should be understood to be illustrative and not unduly limiting. To reduce mechanical stresses at the film terminus, the notch 1426 may be filled with a tough, clear filler material 1427 such as a hard coat material or other suitable polymer or other solid material. To reduce optical artifacts associated with the notch 1426, the filler material 1427 may have a refractive index that matches or substantially matches the refractive index of the lens sections 1422, 1424. An outer surface of the filler material 1427 may be smooth and shaped to be in substantial registration with the smooth surfaces 1422a, 1424a, such that the outer surface of the filler material 1427 also forms part of the optical surface 1420a. Even though the filler material 1427 is provided in the notch 1426, it is still desirable to process the multilayer optical film 1425 to avoid damaging the edge of the film, thus reducing the chance that breaks, cracks, delaminations, or other edge defects may form at or near the terminus of the film.

In FIG. 15, a lens 1520 may be the same as or similar to the lens of FIG. 13, except that a protective coating is provided over the optical surface of the lens. The lens 1520 thus has an optical axis parallel to the z-axis of an x-y-z Cartesian coordinate system. The lens has a first optical surface 1520a connected to an opposed second optical surface by a circumferential surface. The lens 1520 also includes a first lens section 1522, a second lens section 1524, and a multilayer optical film 1525. The film 1525 is sandwiched between mating surfaces of the lens sections 1522, 1524. The first lens section 1522 has a first smooth surface 1522a, and the second lens section 1524 has a first smooth surface 1524a. The first optical surface 1520a of the lens is convex and includes the first smooth surfaces 1522a, 1524a. The multilayer optical film 1525 partially reflects and partially transmits light as described above, and lies in the x'-y' plane of an x'-y'-z' Cartesian coordinate system which is rotated or tilted relative to the x-y-z coordinate system. The amount of tilt or rotation is such that the film 1525 intersects at least the first optical surface 1520a. At the first optical surface, the film 1525 terminates along an extended terminus 1525t1, which separates the first smooth surface 1522a from the first smooth surface 1524a. The edge or terminus 1525t1 of the multilayer optical film 1525 may be cut and mechanically polished to form a smooth surface disposed to be in substantial registration with the smooth surfaces 1522a, 1524a, such that the terminus 1525t1 also forms part of the optical surface 1520a. The cutting and polishing is carried out carefully to avoid damaging the edge of the film 1525, thus reducing the chance that breaks, cracks, delaminations, or other edge defects may form at or near the terminus of the film. A protective coating 1528, such as a hard coat or other suitable polymer or other solid material, is provided over the terminus 1525t1 as well as the smooth surfaces 1522a, 1524a. If the coating 1528 is applied to the optical surface 1520a as a liquid and then cured into a solid layer, it may penetrate into any breaks, cracks, delaminations, or other edge defects that may be present at the terminus 1525*t*1, and may thus at least partially repair such edge defects from an optical performance standpoint.

Figure 16:
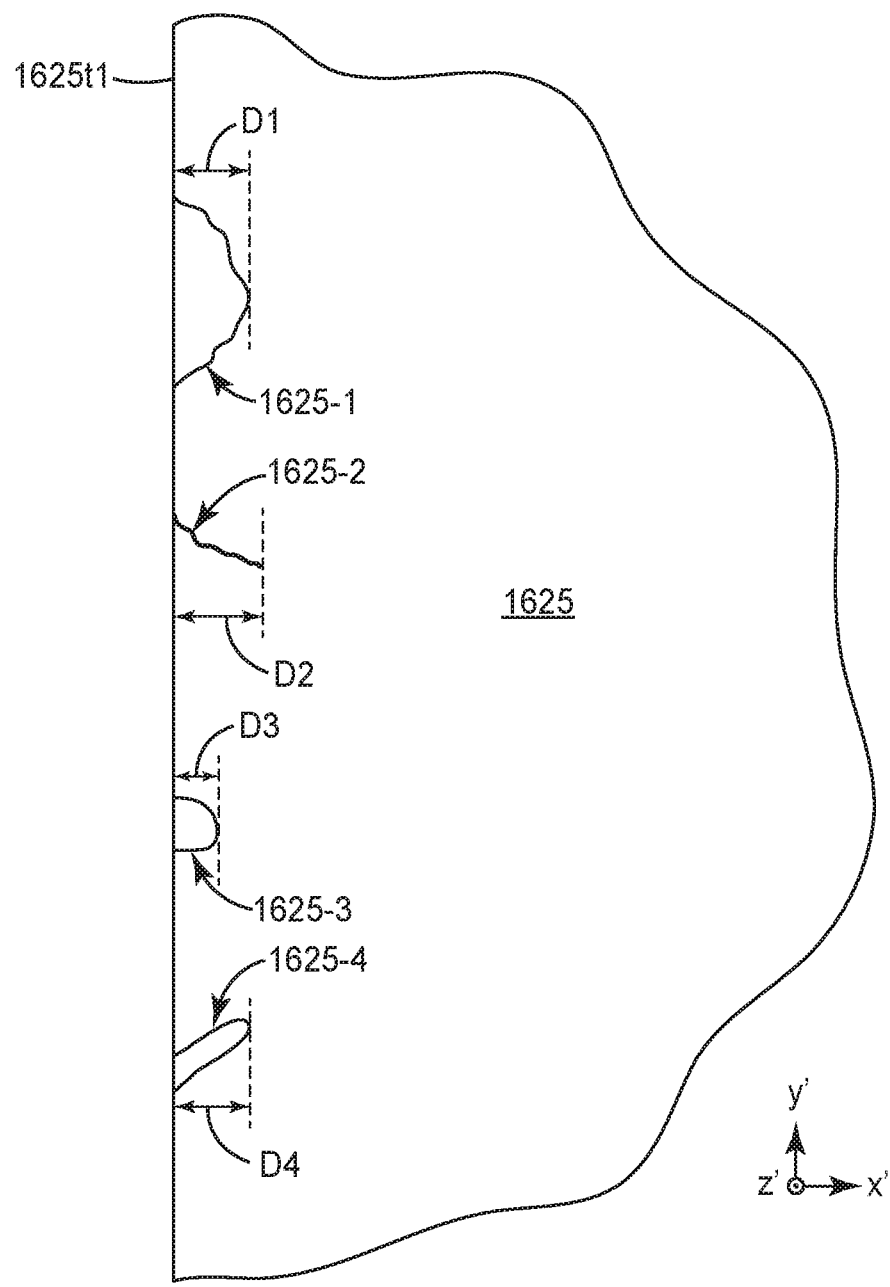
FIG. 16 is a schematic plan or sectional view of a multilayer optical film with various idealized edge defects along the extended terminus of the film.

A schematic, magnified view of a portion of a multilayer optical film in the vicinity of its extended edge or terminus is shown in FIG. 16. In that figure, a multilayer optical film 1625 may be the same as or similar to other optical films discussed herein. The film 1625 has been cut, polished, and/or otherwise processed to have an extended terminus 1625*t*1, this terminus desirably being situated at or near an optical surface of a lens. The film 1625 is assumed to lie in an x'-y' plane of a Cartesian x'-y'-z' coordinate system, which coordinate system is rotated or tilted relative to a coordinate system aligned with the optical axis of the lens. Several idealized edge defects 1625-1, 1625-2, 1625-3, and 1625-4 are shown in the figure, which defects may be or include breaks, cracks, or delaminations of the multilayer optical film 1625. Each defect can be characterized by a defect distance, which is measured in the plane of the film 1625, perpendicular to the terminus 1625*t*1. Thus, edge defect 1625-1 is characterized by a defect distance D1, edge defect 1625-2 is characterized by a defect distance D2, edge defect 1625-3 is characterized by a defect distance D3, and edge defect 1625-4 is characterized by a defect distance D4. These defect distances can be averaged together to provide an average defect distance for the terminus 1625*t*1 or a portion thereof. In order to ensure high quality optical performance of the lens within which the film 1625 is embedded, the average defect distance for the terminus 1625*t*1 is controlled to be no more than 100 microns, or no more than 50 microns.

Figure 17A:
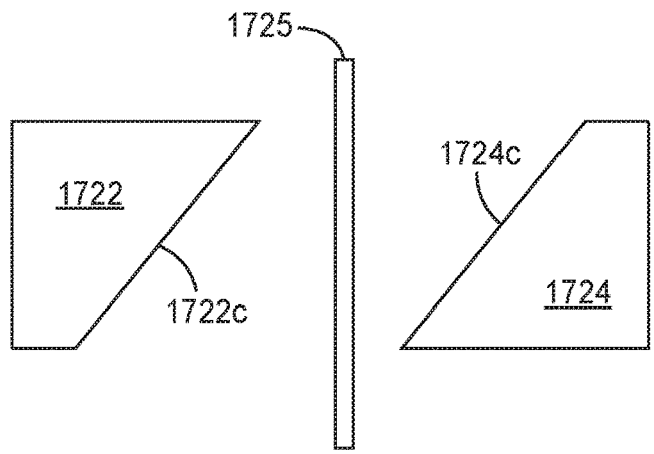
FIGS. 17A through 17C are schematic side or sectional views showing how a multilayer optical film can be combined with two optical bodies to fabricate a lens having an embedded multilayer optical film.
Figure 17B:
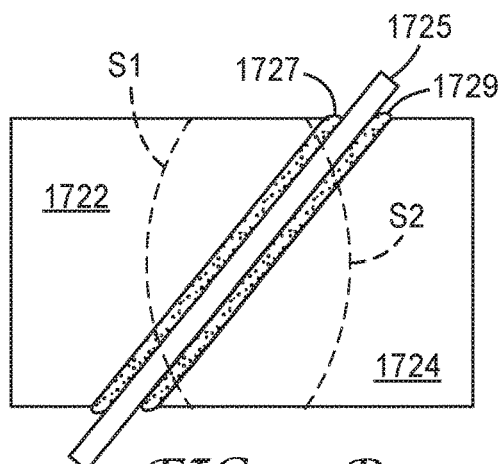
Figure 17C:
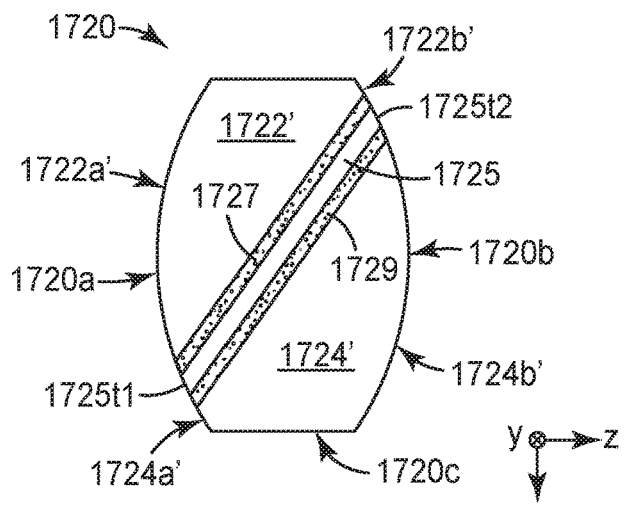

Schematic drawings that show one way of combining a multilayer optical film with two optical bodies to fabricate a lens, such as any of the lenses discussed herein, are provided by FIGS. 17A through 17C. The manufacturing technique illustrated by these figures should not be construed to be unduly limiting, but illustrative. In FIG. 17A, a first optical body 1722, a second optical body 1724, and a multilayer optical film 1725 are provided. The bodies 1722, 1724 have mating surfaces 1722*c*, 1724*c*, respectively. In FIG. 17B, a compound optical body is formed by bonding the bodies 1722, 1724 together with the multilayer optical film 1725 sandwiched therebetween. Light transmissive bonding layers 1727, 1729, which may be or comprise an optically clear optical adhesive, optical cement, or similar material, may also be included to ensure a strong bond and robust construction. The compound optical body may then be cut and polished or otherwise formed along surfaces of interest S1 and S2, the surfaces S1 and S2 being shaped to provide opposed optical surfaces of a desired lens. As shown in FIG. 17C, the forming of the optical surfaces is carried out to give a smooth surface 1722*a*' to the first optical body (which is now labeled 1722' to distinguish it from the original, uncut body 1722), and a smooth surface 1724*a*' to the second optical body (which is now labeled 1724' to distinguish it from the original, uncut body 1724). These smooth surfaces 1722*a*', 1724*a*' are portions of a first optical surface 1720*a* of the lens 1720 that is produced as a result of the bonding and forming. The forming may also provide the first optical body 1722' with a smooth surface 1722*b*' and the second optical body 1724' with a smooth surface 1724*b*', and these smooth surfaces 1722*b*', 1724*b*' may be portions of a second optical surface 1720*b* of the lens 1720. A circumferential surface 1720*c* may connect the first and second optical surfaces. As part of the forming, the multilayer optical film 1725 may also be terminated at or near the optical surfaces 1720*a*, 1720*b* to provide extended terminuses 1725*t*1, 1725*t*2, respectively, the terminus 1725*t*1 separating the smooth surface 1722*a*' from the smooth surface 1724*a*', and the terminus 1725*t*2 separating the smooth surface 1722*b*' from the smooth surface 1724*b*'. The film 1725 is terminated in such a way as to avoid edge defects in the multilayer optical film 1725 along the extended terminuses, with any such edge defects being characterized by an average defect distance of no more than 100 microns, or no more than 50 microns.

Numerous modifications can be made to the foregoing teachings. In one such modification, the disclosed designs and techniques can also be applied to optical components other than lenses. Such other optical components may be the same as or similar to any of the disclosed lenses having embedded multilayer optical films, except that both of the opposed optical surfaces can be made to be flat, i.e., neither of the opposed optical surfaces are curved. Such an optical component may include a first section having a first smooth surface and a side surface, a second section having a first smooth surface, a second smooth surface, and a side surface, the second section shaped to mate with the first section, and a multilayer optical film embedded in the optical component between the first and second sections. The first optical surface of the component may comprise the first smooth surface of the first section and the first smooth surface of the second section, and the second optical surface of the component may comprise the second smooth surface of the second section. The multilayer optical film may comprise a first extended terminus that separates the first smooth surface of the first section from the first smooth surface of the second section. Such optical components may in some cases be used as beamsplitting windows and combined with one or more imaging devices in eyewear that may be suitable for Near-Eye Displays and similar applications.

Unless otherwise indicated, all numbers expressing quantities, measurement of properties, and so forth used in the specification and claims are to be understood as being modified by the term "about". Accordingly, unless indicated to the contrary, the numerical parameters set forth in the specification and claims are approximations that can vary depending on the desired properties sought to be obtained by those skilled in the art utilizing the teachings of the present application. Not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, to the extent any numerical values are set forth in specific examples described herein, they are reported as precisely as reasonably possible. Any numerical value, however, may well contain errors associated with testing or measurement limitations.

Various modifications and alterations of this invention will be apparent to those skilled in the art without departing from the spirit and scope of this invention, and it should be understood that this invention is not limited to the illustrative embodiments set forth herein. The reader should assume that features of one disclosed embodiment can also be applied to all other disclosed embodiments unless otherwise indicated. All U.S. patents, patent application publications, and other patent and non-patent documents referred to herein are incorporated by reference, to the extent they do not contradict the foregoing disclosure.

This application discloses a variety of items relating to lenses and related optical components having a partially reflective element. These include, but are not limited to, the numbered items below.

Item 1 is a lens having first and second opposed optical surfaces connected by a circumferential surface, the lens comprising:
- a first lens section having a first smooth surface and a side surface;
- a second lens section having a first smooth surface, a second smooth surface, and a side surface; and
- a multilayer optical film embedded in the lens between the first and second lens sections, the multilayer optical film comprising a plurality of polymer layers configured to selectively reflect light by constructive or destructive interference, at least some of the polymer layers being birefringent;
- wherein the first optical surface comprises the first smooth surface of the first lens section and the first smooth surface of the second lens section;
- wherein the second optical surface comprises the second smooth surface of the second lens section; and
- wherein the multilayer optical film comprises a first extended terminus that separates the first smooth surface of the first lens section from the first smooth surface of the second lens section.

Item 2 is the lens of item 1, wherein the circumferential surface comprises the side surface of the first lens section and the side surface of the second lens section.

Item 3 is the lens of any previous item, wherein the first optical surface also comprises the first extended terminus.

Item 4 is the lens of item 1 or item 2, wherein the first extended terminus is disposed in a first extended notch that separates the first smooth surface of the first lens section from the first smooth surface of the second lens section.

Item 5 is the lens of item 4, wherein the first extended notch is no more than 250 microns deep.

Item 6 is the lens of any previous item, wherein to the extent the multilayer optical film has any edge defects along the first extended terminus, such edge defects are characterized by a first average defect distance of no more than 100 microns.

Item 7 is the lens of item 6, wherein the first average defect distance is no more than 50 microns.

Item 8 is the lens of any previous item, wherein the first optical surface is curved, and the first extended terminus is arc-shaped.

Item 9 is the lens of any of items 1-7, wherein the first optical surface is flat, and the first extended terminus is straight.

Item 10 is the lens of any previous item, wherein the first lens section also has a second smooth surface, wherein the second optical surface comprises the second smooth surface of the first lens section and the second smooth surface of the second lens section, and wherein the multilayer optical film comprises a second extended terminus that separates the second smooth surface of the first lens section from the second smooth surface of the second lens section.

Item 11 is the lens of item 10, wherein the second optical surface also comprises the second extended terminus.

Item 12 is the lens of item 10, wherein the second extended terminus is disposed in a second extended notch that separates the second smooth surface of the first lens section from the second smooth surface of the second lens section.

Item 13 is the lens of any of items 10-12, wherein to the extent the multilayer optical film has any edge defects along the second extended terminus, such edge defects are characterized by a second average defect distance of no more than 100 microns.

Item 14 is the lens of item 13, wherein the second average defect distance is no more than 50 microns.

Item 15 is the lens of any previous item, wherein, for at least one visible wavelength of normally incident light, or at another design angle of incidence, the multilayer optical film is configured as a reflective polarizer.

Item 16 is the lens of any previous item, wherein, for at least one polarization state of normally incident light, or at another design angle of incidence, the multilayer optical film is configured as a notch filter.

Item 17 is the lens of item 16, wherein, for at least one visible wavelength of normally incident light, or at another design angle of incidence, the multilayer optical film is configured as a reflective polarizer.

Item 18 is the lens of any previous item, further comprising a protective coating that covers the first smooth surface of the first lens section, the first smooth surface of the second lens section, and the first extended terminus.

Item 19 is the lens of any previous item, further comprising an absorptive layer that covers the first optical surface or the second optical surface.

Item 20 is the lens of item 19, wherein the absorptive layer comprises an absorptive polarizer.

Item 21 is a compound lens, comprising:
- the lens of any previous item; and
- a second lens bonded to the lens of any previous item.

Item 22 is a system, comprising:
- the lens of any previous item; and
- an imaging device disposed to direct imaging light towards the multilayer optical film.

Item 23 is the system of item 22, wherein the multilayer optical film is configured to selectively reflect visible light of a first characteristic and selectively transmit visible light of a second characteristic, and wherein the imaging light comprises the first characteristic.

Item 24 is the system of item 23, wherein the first and second characteristics are orthogonal first and second polarization states, respectively, and wherein the lens further comprises an absorptive polarizer configured to absorb light of the second polarization state.

Item 25 is the system of any of items 22-24, wherein the system comprises eyewear.

Item 26 is an optical component having first and second opposed optical surfaces connected by a circumferential surface, the optical component comprising:
- a first section having a first smooth surface and a side surface;
- a second section having a first smooth surface, a second smooth surface, and a side surface, the second section shaped to mate with the first section; and
- a multilayer optical film embedded in the optical component between the first and second sections, the multilayer optical film comprising a plurality of polymer layers arranged to selectively reflect light by constructive or destructive interference, at least some of the polymer layers being birefringent;
- wherein the first optical surface comprises the first smooth surface of the first section and the first smooth surface of the second section;
- wherein the second optical surface comprises the second smooth surface of the second section; and wherein the multilayer optical film comprises a first extended terminus that separates the first smooth surface of the first section from the first smooth surface of the second section.

Item 27 is the optical component of item 26, wherein both the first and second optical surfaces are flat.

Item 28 is a method of making a lens, comprising:
providing a first optical body and a second optical body, the second optical body shaped to mate with the first optical body;
providing a multilayer optical film, the multilayer optical film comprising a plurality of polymer layers configured to selectively reflect light by constructive or destructive interference, at least some of the polymer layers being birefringent;
bonding the first and second optical bodies together with the multilayer optical film sandwiched therebetween to form a compound optical body;
forming a first optical surface in the compound optical body, the forming being carried out to give a first smooth surface to the first optical body and a second smooth surface to the second optical body, the first and second smooth surfaces being portions of the first optical surface, the optical body also having, or made to have, a second optical surface opposite the first optical surface, and a circumferential surface that connects the first and second optical surfaces; and
terminating the multilayer optical film along an extended terminus that separates the first smooth surface from the second smooth surface.

Item 29 is the method of item 28, wherein the terminating is carried out to avoid edge defects in the multilayer optical film along the extended terminus, with any such edge defects being characterized by a first average defect distance of no more than 100 microns.

Item 30 is the method of item 29, wherein the terminating comprises polishing an end of the multilayer optical film, and wherein the forming comprises polishing the first and second optical bodies.

Item 31 is the method of any of items 28-30, further comprising:
forming an extended notch in the first optical surface such that the extended terminus is disposed in the extended notch.

Item 32 is the method of any of items 28-31, further comprising:
forming a protective coating over all, or substantially all, or a portion of, the first optical surface.

The invention claimed is:

1. An optical system comprising:
a lens comprising opposing first and second major surfaces; and
a multilayer reflective polarizer embedded in the lens and extending between the first and second major surfaces, the multilayer reflective polarizer separating the first major surface into adjacent first and second surface portions of the first major surface, and separating the second major surface into adjacent first and second surface portions of the second major surface;
wherein the adjacent first and second surface portions of the first major surface are separated by a first extended notch that extends across the entire first major surface, and the multilayer reflective polarizer terminates along an extended terminus which lies at a bottom of, but does not extend into, the first extended notch.

2. The optical system of claim 1, wherein the multilayer reflective polarizer separates the lens into two sections.

3. The optical system of claim 1, wherein the lens further comprises a circumferential surface extending between and connecting the first and second major surfaces of the lens.

4. The optical system of claim 3, wherein the multilayer reflective polarizer extends from a first side of the circumferential surface on a first lateral side of the lens to an opposite second side of the circumferential surface on an opposite second lateral side of the lens.

5. The optical system of claim 1, wherein the first extended notch is no more than 250 microns deep.

6. The optical system of claim 1, wherein the adjacent first and second surface portions of the second major surface are separated by a second extended notch that extends across the entire second major surface.

7. The optical system of claim 6, wherein the second extended notch is no more than 250 microns deep.

8. The optical system of claim 1, wherein at least one of the first and second major surfaces is flat.

9. The optical system of claim 1, wherein at least one of the first and second major surfaces is curved.

10. The optical system of claim 1, further comprising another lens bonded to the lens.

11. The optical system of claim 1, further comprising an imaging device disposed to direct imaging light toward the multilayer reflective polarizer.

12. The optical system of claim 1, wherein the first extended notch is filled with an optically clear filler material.

13. The optical system of claim 12, wherein the optically clear filler material has a refractive index that substantially matches the refractive index of the lens.

* * * * *